(12) United States Patent
Wolfe et al.

(10) Patent No.: US 11,429,260 B2
(45) Date of Patent: Aug. 30, 2022

(54) PERSONALIZED CURATION AND CUSTOMIZED SOCIAL INTERACTION

(71) Applicant: eBay Inc., San Jose, CA (US)

(72) Inventors: Jesse Wolfe, Sammamish, WA (US); Matthew Bret Maclaurin, Santa Cruz, CA (US); Hsin-Yi Chien, Cupertino, CA (US); Jai Dandekar, San Jose, CA (US); James Ross Skorupski, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/719,620

(22) Filed: Dec. 18, 2019

(65) Prior Publication Data
US 2020/0125240 A1 Apr. 23, 2020

Related U.S. Application Data

(63) Continuation of application No. 13/602,094, filed on Aug. 31, 2012, now abandoned.

(51) Int. Cl.
*G06F 3/04842* (2022.01)
*G06Q 30/06* (2012.01)

(52) U.S. Cl.
CPC ..... *G06F 3/04842* (2013.01); *G06Q 30/0601* (2013.01)

(58) Field of Classification Search
None
See application file for complete search history.

(56) References Cited

U.S. PATENT DOCUMENTS

| 5,911,146 | A | * | 6/1999 | Johari | G06F 40/114 |
| | | | | | 715/234 |
| 6,700,589 | B1 | | 3/2004 | Canelones et al. | |
| 7,856,380 | B1 | * | 12/2010 | Latin-Stoermer | G06V 10/751 |
| | | | | | 705/27.1 |
| 7,966,334 | B1 | * | 6/2011 | Bezos | G06Q 30/06 |
| | | | | | 707/748 |
| 8,086,504 | B1 | | 12/2011 | Dicker et al. | |
| 8,121,902 | B1 | | 2/2012 | Desjardins et al. | |
| 8,170,916 | B1 | | 5/2012 | Dicker et al. | |
| 8,296,291 | B1 | | 10/2012 | Desjardins | |
| 8,355,955 | B1 | * | 1/2013 | Mirchandani | G06Q 30/0255 |
| | | | | | 705/26.1 |
| 8,364,669 | B1 | | 1/2013 | Chowdhury et al. | |
| 8,595,209 | B1 | | 11/2013 | Kraybill | |
| 8,612,428 | B2 | | 12/2013 | Ito | |
| 8,825,658 | B1 | | 9/2014 | Suvar | |

(Continued)

OTHER PUBLICATIONS

Applicant Initiated Interview Summary received for U.S. Appl. No. 13/602,094, dated Apr. 22, 2015, 3 pages.

(Continued)

*Primary Examiner* — Linda Huynh
(74) *Attorney, Agent, or Firm* — FIG. 1 Patents

(57) ABSTRACT

A method of enhancing a network-based publication system with curator lists is disclosed. Information pertaining to an item is received from a submitter of a listing of the item on a network-based publication system. Metadata pertaining to the information about the item is received from a curator of the information pertaining to the item. A presentation of the information on a curator list is controlled based on the metadata.

20 Claims, 25 Drawing Sheets

(56) References Cited

U.S. PATENT DOCUMENTS

| | | | |
|---|---|---|---|
| 9,087,035 B1* | 7/2015 | Bandaru | G06F 40/186 |
| 9,721,291 B1* | 8/2017 | Kennis | G06Q 30/0643 |
| 2002/0065802 A1 | 5/2002 | Uchiyama | |
| 2004/0039663 A1 | 2/2004 | Kernz | |
| 2004/0098360 A1 | 5/2004 | Witwer et al. | |
| 2004/0201691 A1* | 10/2004 | Bryant | H04N 1/2112 348/207.1 |
| 2005/0149583 A1 | 7/2005 | Baskaran et al. | |
| 2006/0004914 A1 | 1/2006 | Kelly et al. | |
| 2006/0184620 A1 | 8/2006 | Melet et al. | |
| 2006/0224406 A1 | 10/2006 | Leon et al. | |
| 2006/0253345 A1* | 11/2006 | Heber | G06Q 10/06395 705/26.1 |
| 2007/0209025 A1 | 9/2007 | Jing et al. | |
| 2007/0239552 A1 | 10/2007 | Sundaresan | |
| 2007/0288454 A1 | 12/2007 | Bolivar et al. | |
| 2008/0007788 A1 | 1/2008 | Good et al. | |
| 2008/0097981 A1* | 4/2008 | Williams | G06F 16/58 |
| 2008/0134045 A1* | 6/2008 | Fridman | G06F 9/451 715/735 |
| 2008/0222201 A1 | 9/2008 | Chen et al. | |
| 2008/0243897 A1 | 10/2008 | Petri | |
| 2009/0055292 A1 | 2/2009 | Chong et al. | |
| 2009/0106307 A1* | 4/2009 | Spivack | G06Q 30/02 |
| 2009/0171680 A1* | 7/2009 | Wiesinger | G06Q 30/0641 705/346 |
| 2009/0240735 A1 | 9/2009 | Grandhi et al. | |
| 2010/0005380 A1 | 1/2010 | Lanahan et al. | |
| 2010/0057646 A1* | 3/2010 | Martin | G16H 15/00 706/11 |
| 2010/0241650 A1 | 9/2010 | Chittar | |
| 2010/0250336 A1 | 9/2010 | Selinger et al. | |
| 2010/0250399 A1 | 9/2010 | Williams et al. | |
| 2011/0029408 A1 | 2/2011 | Shusterman et al. | |
| 2011/0106584 A1 | 5/2011 | Borthwick et al. | |
| 2011/0202557 A1 | 8/2011 | Atsmon et al. | |
| 2011/0202827 A1 | 8/2011 | Freishtat et al. | |
| 2011/0320407 A1 | 12/2011 | Augustine et al. | |
| 2012/0036251 A1 | 2/2012 | Beaty et al. | |
| 2012/0072312 A1 | 3/2012 | Lange et al. | |
| 2012/0239506 A1* | 9/2012 | Saunders | G06Q 30/02 705/14.67 |
| 2012/0271825 A1 | 10/2012 | Garthwaite et al. | |
| 2012/0284245 A1* | 11/2012 | Portnoy | G06Q 30/02 707/706 |
| 2012/0290448 A1 | 11/2012 | England et al. | |
| 2012/0324351 A1* | 12/2012 | Gao | G06F 16/9577 715/269 |
| 2013/0030949 A1 | 1/2013 | Sundaresan | |
| 2013/0030987 A1 | 1/2013 | Zuckerberg et al. | |
| 2013/0097481 A1 | 4/2013 | Kotler et al. | |
| 2013/0161383 A1* | 6/2013 | Hashimoto | H04N 1/00167 235/375 |
| 2014/0068450 A1 | 3/2014 | Wolfe et al. | |
| 2014/0096038 A1 | 4/2014 | Schultz | |

OTHER PUBLICATIONS

Applicant Initiated Interview Summary received for U.S. Appl. No. 13/602,094, dated Jun. 26, 2019, 3 pages.
Applicant Initiated Interview Summary received for U.S. Appl. No. 13/602,094, dated Jul. 17, 2018, 3 pages.
Applicant Initiated Interview Summary received for U.S. Appl. No. 13/602,094, dated Mar. 30, 2018, 3 pages.
Applicant Interview Summary received for U.S. Appl. No. 13/602,094 dated Nov. 14, 2019, 3 pages.
Final Office Action received for U.S. Appl. No. 13/602,094, dated Jun. 27, 2018, 17 pages.
Final Office Action received for U.S. Appl. No. 13/602,094, dated Aug. 6, 2015, 26 pages.
Final Office Action received for U.S. Appl. No. 13/602,094, dated Jan. 6, 2017, 13 pages.
Final Office Action received for U.S. Appl. No. 13/602,094, dated Sep. 18, 2019, 16 pages.
Non-Final Office Action received for U.S. Appl. No. 13/602,094, dated Apr. 11, 2016, 12 pages.
Non-Final Office Action received for U.S. Appl. No. 13/602,094, dated Feb. 22, 2018, 14 pages.
Non-Final Office Action received for U.S. Appl. No. 13/602,094, dated Mar. 2, 2015, 23 pages.
Non-Final Office Action received for U.S. Appl. No. 13/602,094, dated May 22, 2019, 15 pages.
Preliminary Amendment filed for U.S. Appl. No. 13/602,094, dated Jan. 30, 2014, 5 pages.
Response to Final Office Action filed on Apr. 6, 2017, for U.S. Appl. No. 13/602,094, dated Jan. 6, 2017, 13 pages.
Response to Final Office Action filed on Jan. 6, 2016, for U.S. Appl. No. 13/602,094, dated Aug. 6, 2015, 13 pages.
Response to Final Office Action filed on Sep. 27, 2018, for U.S. Appl. No. 13/602,094, dated Jun. 27, 2018, 28 pages.
Response to Non-Final Office Action filed on Apr. 23, 2015, for U.S. Appl. No. 13/602,094, dated Mar. 2, 2015, 12 pages.
Response to Non-Final Office Action filed on May 22, 2018, for U.S. Appl. No. 13/602,094, dated Feb. 22, 2018, 26 pages.
Response to Non-Final Office Action filed on Sep. 12, 2016, for U.S. Appl. No. 13/602,094, dated Apr. 11, 2016, 10 pages.
Response to Non-Final Office Action filed on Aug. 16, 2019, for U.S. Appl. No. 13/602,094, dated May 22, 2019, 16 pages.

* cited by examiner

FIG. 18

PERSONALIZED CURATION AND CUSTOMIZED SOCIAL INTERACTION

RELATED APPLICATION

This application is a continuation of and claims priority to U.S. patent application Ser. No. 13/602,094, filed Aug. 31, 2012 which is incorporated by reference herein in its entirety.

TECHNICAL FIELD

The present application relates generally to the technical field of information sharing, and, in one specific example, to allowing users of an online publication system to serve as curators and customizers of content on the online publication system.

BACKGROUND

Various online marketplace systems or network-based publication systems (e.g., EBAY®, AMAZON®, or CRAIGSLIST®) facilitate transactions pertaining to items (e.g., goods or services) that users list on the online marketplace systems. Users may be able to find related listings within the online marketplace by entering a search query that includes keywords that match keywords included in the listings, such as in the titles or descriptions of the listings. However, the results of such keyword-matching may include many listings having a low relevancy to the user's search, requiring the user to manually filter through the results to find the closest matches.

BRIEF DESCRIPTION OF THE DRAWINGS

Some embodiments are illustrated by way of example and not limitation in the figures of the accompanying drawings in which:

FIG. 18 is a screenshot of a portion of an example user interface for submitting a curator list for publication to other users.

DETAILED DESCRIPTION

In the following description, for purposes of explanation, numerous specific details are set forth in order to provide an understanding of various embodiments of the present subject matter. It will be evident, however, to those skilled in the art that various embodiments may be practiced without these specific details.

Consistent with various embodiments, a method of enhancing a network-based publication system with curator lists is disclosed. Information pertaining to an item is received from a submitter of a listing of the item on a network-based publication system. Metadata pertaining to the information about the item is received from a curator of the information pertaining to the item. A presentation of the information on a curator list is controlled based on the metadata.

This method and the various embodiments disclosed herein may be implemented as a computer system having one or more modules (e.g., hardware modules or software modules). This method and the various embodiments disclosed herein may be embodied as instructions stored on a machine-readable medium that, when executed by a processor, cause the processor to perform the method.

As used herein, a curator list is a list of information (e.g., images, descriptions, and so on) pertaining to items capable of being listed on a network-based publication system that is assembled, filtered, formatted, or otherwise customized or personalized by a curator for presentation to a user.

Figure 1:
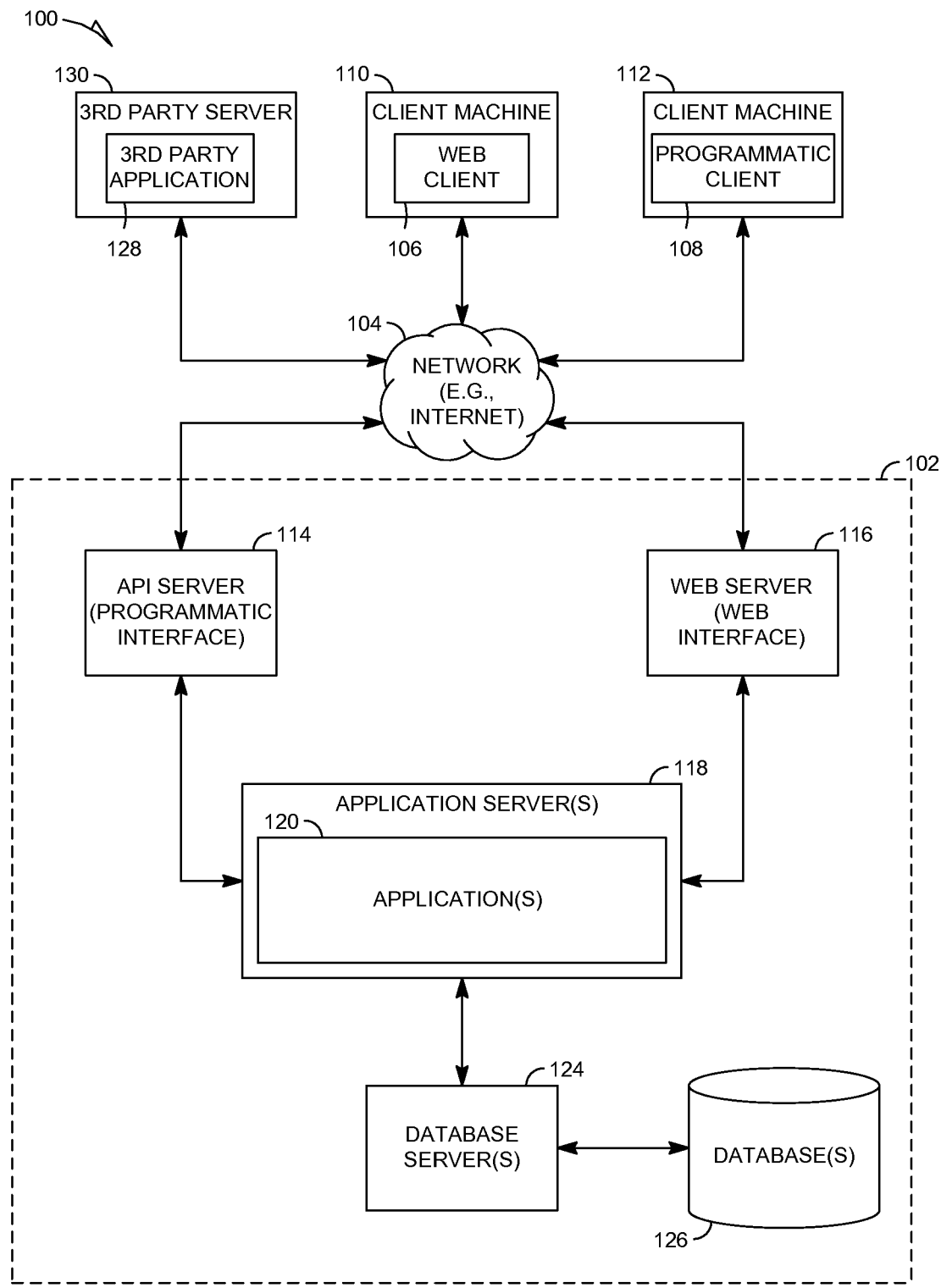
FIG. 1 is a network diagram depicting a system within which various example embodiments may be deployed.

FIG. 1 is a network diagram depicting a system 100 within which various example embodiments may be deployed. A networked system 102, in the example forms of a network-based marketplace or other publication system, provides server-side functionality, via a network 104 (e.g., the Internet or Wide Area Network (WAN)) to one or more clients. FIG. 1 illustrates, for example, a web client 106 (e.g., a browser, such as the Internet Explorer® browser developed by Microsoft® Corporation of Redmond, Wash.) and a programmatic client 108 executing on respective client machines 110 and 112. Each of the one or more clients may include a software application module (e.g., a plug-in, add-in, or macro) that adds a specific service or feature to a larger system.

An API server 114 and a web server 116 are coupled to, and provide programmatic and web interfaces respectively to, one or more application servers 118. The application servers 118 host one or more applications. The application servers 118 are, in turn, shown to be coupled to one or more database servers 124 that facilitate access to one or more databases 126 or "not only SQL" (NoSQL) or non-relational data stores.

The marketplace applications 120 may provide a number of marketplace functions and services to users that access the networked system 102. While the applications 120 are shown in FIG. 1 to form part of the networked system 102, in alternative embodiments, the applications 120 may form part of a service that is separate and distinct from the networked system 102.

Further, while the system 100 shown in FIG. 1 employs a client-server architecture, various embodiments are, of course, not limited to such an architecture, and could equally well find application in a distributed, or peer-to-peer, architecture system, for example. The various marketplace and applications 120 could also be implemented as standalone software programs, which do not necessarily have networking capabilities. Additionally, although FIG. 1 depicts machines 130, 110, and 112 as being coupled to a single networked system 102, it will be readily apparent to one skilled in the art that machines 130, 110, and 112, as well as applications 128, 106, and 108, may be coupled to multiple networked systems. For example, the application 128, 106, and 108 may be coupled to multiple payment applications, such as payment applications associated with multiple payment processors (e.g., Visa, MasterCard, and American Express).

The web client 106 accesses the various applications 120 via the web interface supported by the web server 116. Similarly, the programmatic client 108 accesses the various services and functions provided by the applications 120 via the programmatic interface provided by the API server 114. The programmatic client 108 may, for example, be a seller application (e.g., the TurboLister application developed by eBay Inc., of San Jose, Calif.) to allow sellers to author and manage listings on the networked system 102 in an off-line manner, and to perform batch-mode communications between the programmatic client 108 and the networked system 102.

FIG. 1 also illustrates a third-party application 128, executing on a third-party server machine 130, as having programmatic access to the networked system 102 via the programmatic interface provided by the API server 114. For example, the third-party application 128 may, utilizing information retrieved from the networked system 102, support one or more features or functions on a website hosted by the third party. The third-party website may, for example, provide one or more promotional, marketplace or payment functions that are supported by the relevant applications of the networked system 102.

The applications 120, described in more detail below, may allow users of the network-based publication system to become curators of information about items capable of being listed on the network-based publication system. For example, the applications 120 may enable users to generate a curator list of multiple items listed in a network-based publication system, customize a presentation of related items, including their images, and publish the curator list for other users to access, as described in more detail below.

Figure 2:
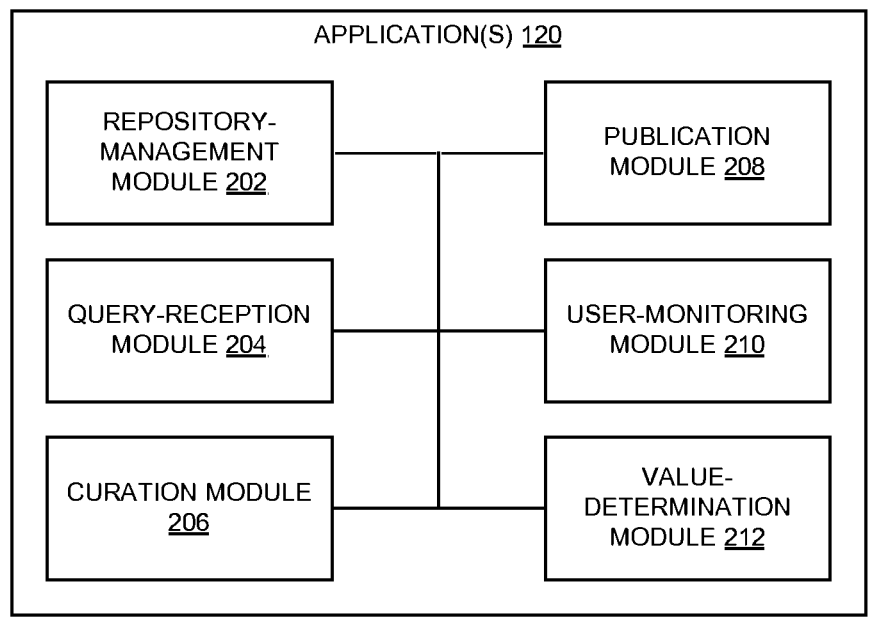
FIG. 2 is a block diagram illustrating example modules of the applications of FIG. 1.

FIG. 2 is a block diagram illustrating example modules of the applications 120. An repository-management module 202 stores information and metadata about items described in listings published by the network-based publication system in central or user-specific databases. A querying module 204 receives queries from users pertaining to items that may be listed on the network-based publication system. A curation module 206 allows users to curate information, including images, related to the various items. Additionally, the curation module 206 allows users to customize a presentation of the curated information. A publication module 206 allows a user-curator to publish the curated and customized information to other users of the network-based publication system. A user-monitoring module 208 monitors activities of the other users with respect to the curated and customized information about the item. A value-determination module 210 determines a value of the curated and customized information based on various factors, such as a popularity of a curated and customized image associated with the item.

Figure 3:
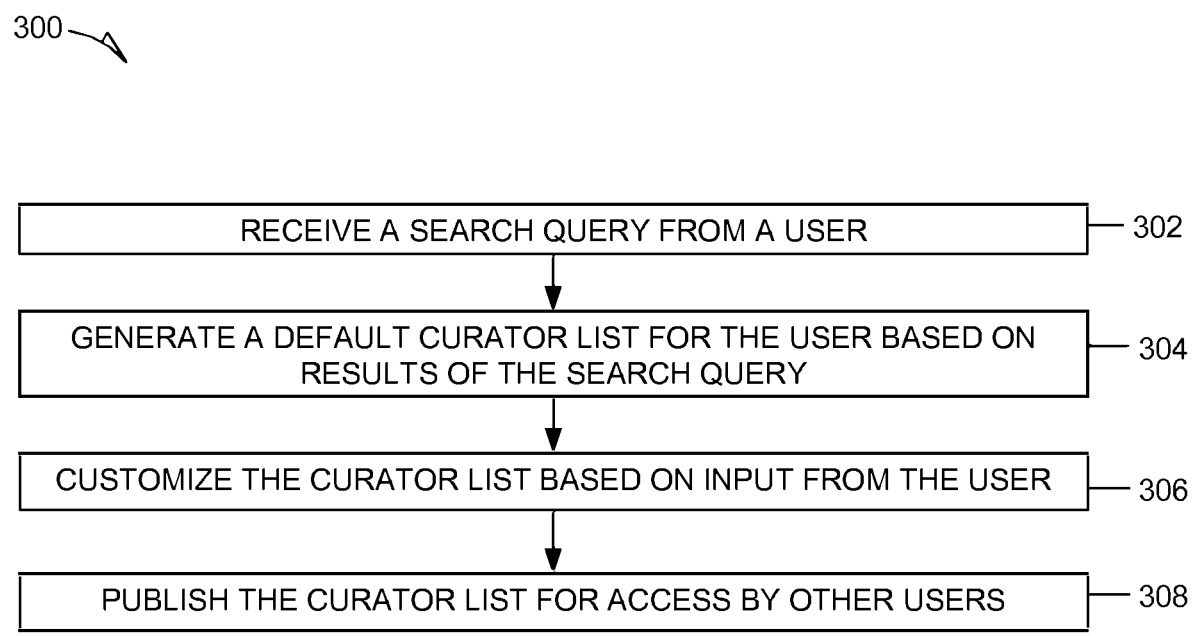
FIG. 3 is a flowchart illustrating an example method of creating a curator list.

FIG. 3 is a flowchart illustrating an example method 300 of creating a curator list. At operation 302, the query module 202 receives a search query from a user. The search query may specify one or more keywords associated with an item for which the user seeks information. The query module 202 may determine one or more matches for the query based on a correspondence between the keywords and information about items (e.g., titles or descriptions of items) maintained by the network-based publication system in a database. For example, the network-based publication system may maintain such information for items that are currently or were recently published by the network-based publication system.

Figure 11:
FIG. 11 is a screenshot of a portion of an example user interface for presenting a curator list.

At operation 304, the curation module 206 generates a default curator list as a starting point for further curation by the user. For example, the curation module 206 selects a number of the results based on their relevance, identifies one or more items associated with each of the items included in the results, and presents an image associated with each of the results in a list having a grid form. For example, FIG. 11 is an example of a default curator list that may be generated by the curation module 206 for a query that includes the keywords "mens shoes size 12." The curation module 206 may further generate default information to associate with the curator list, such as a default title, a default description, default highlighting or filtering options (e.g., for highlighting or filtering items in the curator list by categories or sellers), default statistics for the curator list (e.g., a number of items in the curator list, a number of categories with which the items are associated, or a number of "likes" users have expressed with regard to the items in the curator list).

At operation 306, the curation module 206 customizes the curator list based on input for the user. For example, the curation module 206 may receive instructions from the user to reorder or resize a frame for an image corresponding to an item in the curator list. In some instances, the curation module 206 may receive instructions from the user to resize, reposition, or crop an image of an item within the frame for the image. In other instances, the curation module 206 may receive instructions from the user to apply a particular photographic style or formatting to an image (e.g., sepiatone, blur, black-white, or monotone formatting). The curation module 206 may receive instructions from the user to apply a particular formatting to a font associated with a description of the item. The curation module 206 may receive instructions from the user to change the title or description associated with the list, remove highlighting or filtering options associated with the list, and so on. The curation module 206 may receive instructions from the user to reorder or remove an image of a stack of images associated with an item in the curator list. Additionally, the user may be able to add images to the stack of images associated with the item. The user may be able to add back-of-photo information as a last image in a stack of images associated with an item. The back-of-photo information may include price, title, description, a dynamic auction countdown, or any other data about the item that is maintained by the network-based publication with respect to listings of the item. The curator may be able to change frame sizes of particular images such that some images have larger frames than other images. The curator may be able to control a layout of the image frames on a page as well as the layout of images within a frame (e.g., whether they are stacked, scattered, or arranged according to a template). The curator may be able to overlay text over images. The curator may allow a user interface element on an image to allow a viewer of the image to navigate directly to a listing of the item on the network-based publication system, buy the item, or place a bid on the item.

The curation module 206 may provide the user with the tools by which the user can provide instructions for personalizing the curator list. For example, the curation module 206 may detect that a user has selected an item in the curator list (e.g., based on a determination that the user has hovered a mouse cursor over an image associated with the item). Based on this detection, the curation module 206 may present the user with options for editing metadata associated with the item that controls how the item is presented in the curator list. For example, the curation module 206 may provide the user with a sliding zoom control when the user hovers a mouse cursor within a frame containing an image associated with an item. The user may then be able to adjust the zoom control to control the size of the image. In this way, the user may, for example, be able to make the sizes of the images displayed in the curator list more consistent with each other. As another example, the curation module 206 may provide the user with a text box into which the user may enter comments pertaining to the user's opinion of the item listed in the curator list. In various embodiments, the tools allow the user to customize the curator list "inline" (e.g., without requiring a refreshing of the page on which the curator list is presented). In various embodiments, the curator may be able to rotate the image in as a three-dimensional object to a preferred angle for viewing of the item contained in the image.

In various embodiments, the curation module 206 generates metadata corresponding to the instructions received from the user. Thus, the curation module 206 need not modify the underlying information maintained by the network-based publication system with respect to each item based on changes requested by the user to customize the presentation of each item in the curator list. Instead, the curation module 206 may merely generate metadata corresponding to the changes and save the metadata (e.g., in a user-specific portion of a database via the repository-management module 202). In various embodiments, the curation module 206 may enable other user to share or copy this metadata. Thus, other users may present an item in their own curated lists in the same manner as the user presents the item in his list.

At operation 308, the publication module 308 publishes the curator list for access by other users (e.g., based upon on an instruction from the user). The publication module 308 may publish the curator list for access by all of the other users or a subset of the other users, such the user's friends (e.g., based on a preference or permission settings specified by the user).

Figure 4:
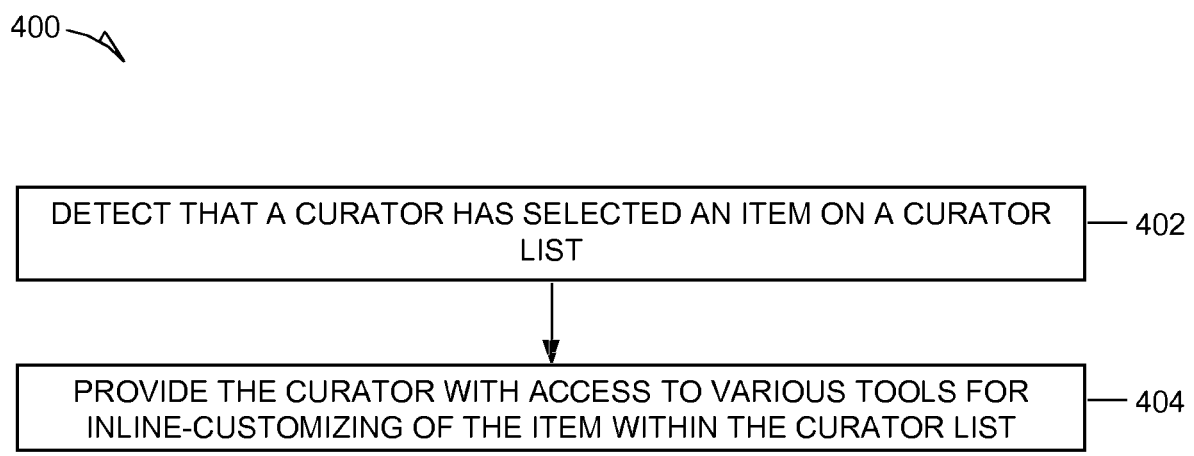
FIG. 4 is a flowchart illustrating an example method of allowing a curator to customize a presentation of an item within a curator list.

FIG. 4 is a flowchart illustrating an example method 400 of allowing a curator to customize a presentation of an item within a curator list. At operation 402, the curation module 206 detects that the curator has selected an item in the curator list (e.g., the user has hovered a mouse cursor over a frame containing an image of the item). At operation 404, the curation module 404 provides the curator with access to various tools for in-line customizing of a presentation of the item. For example, the curation module 404 displays images representing the tools around the perimeter of the frame of an image that the user may select to modify the size of the image or a position of the image within a frame.

Figure 5:
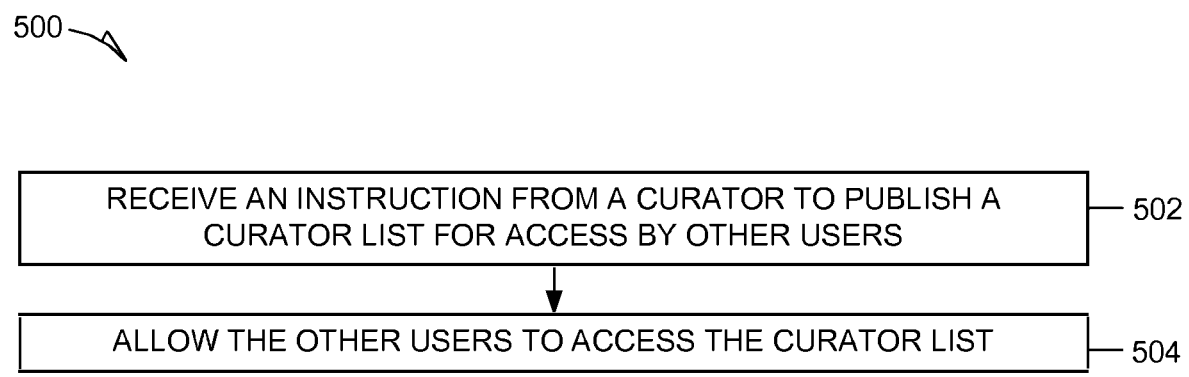
FIG. 5 is a flowchart illustrating an example method of allowing a curator to publish a curator list for access by other users.

FIG. 5 is a flowchart illustrating an example method 500 of allowing a curator to publish a curator list for access by other users. At operation 500, the publication module 208 receives an instruction from a curator to allow other users to access the curator list. The curator may specify that the curator list is to be published to the public at large, all users of the network-based publication system, or a subset of those users. For example, the curator may specify the user identification numbers of specific users that are to be provided access to the curator list. Or the curator may specify a group of users (e.g., friends of the user) that are to be provided with the access. At operation 504, the publication module 208 publishes the curator list in accordance with the instructions received from the user.

Figure 6:
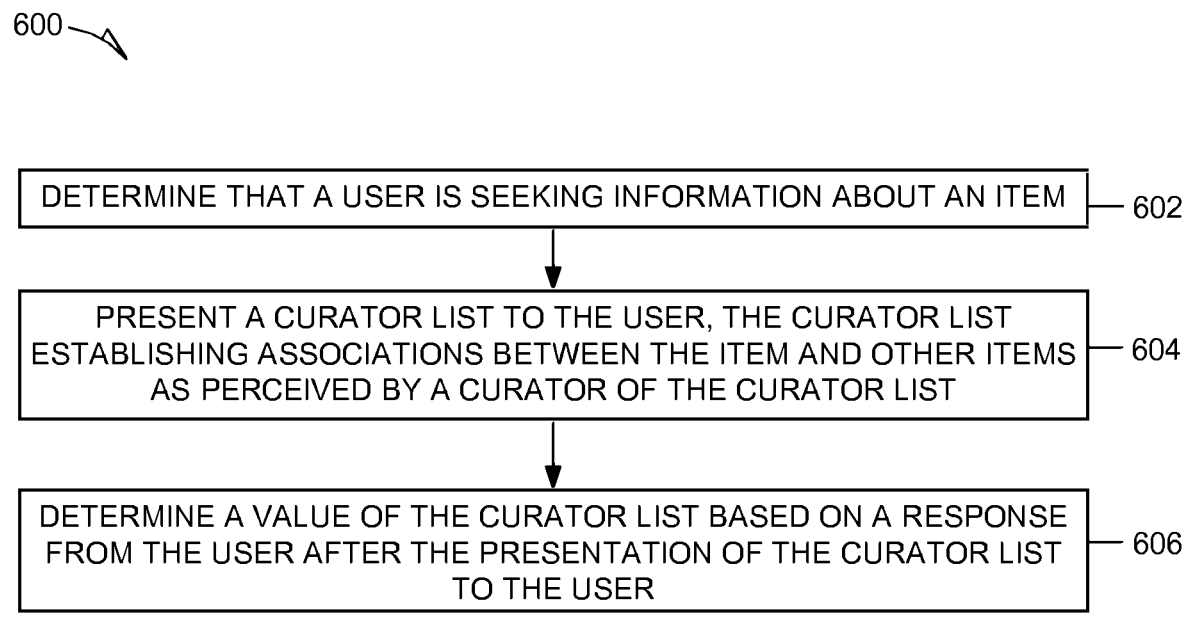
FIG. 6 is a flowchart illustrating an example method of determining a value of a curator list.

FIG. 6 is a flowchart illustrating an example method 600 of determining a value of a curator list. At operation 602, the query-reception module 204 determines that a user is seeking information about an item (e.g., the query-reception module 204 receives a query from the user).

At operation 604, the publication module 208 presents a curator list to the user. The curator list may have been created by a curator based on associations that the curator identified between the items. As such, the relatedness between the items as perceived by the curator may not have been identified by a simple keyword search of information pertaining to the items. Furthermore, the curator list may present the items in a format or style that is personalized by the curator; thus the curator list may be more appealing to the user than a list generated by a search engine that simply includes information about the items as it was provided in a disparate fashion by each of different sellers of the items. The publication module 208 may select a particular curator list from a plurality of curator lists for presentation to the user based on a strength of a correlation between keywords entered by the user and information maintained by the network-based publication system with respect to each item in the curator list or information maintained by the curator in metadata (e.g., tags) associated with each item in the curator list.

At operation 606, the value-determination module 212 determines a value of the curator list based on a response from the user after the presentation of the curator list to the user. For example, the user-monitoring module 210 may monitor behavior of the user with respect to the curator list after a presentation of the curator list to the user. Then, the value-determination module may determine a value of the curator list (e.g., on a scale of 1 to 10) based on a level of engagement by the user, such as how long the user browses the curator list, feedback provided by the user with respect to the curator list, comments that the user makes with respect to items contained in the curator list, "likes" that the user expresses with respect to items on the curator list, whether the user proceeds to purchase an item on the curator list, how much money the user spends on the network-based publication system on items contained in the curator list, and so on. In various embodiments, the value-determination module may determine the value of the curator list based primarily on a determination of increased revenues earned by an operator of the network-based publication system (e.g., via sales commissions) that are directly tied to the curator list.

Figure 7:
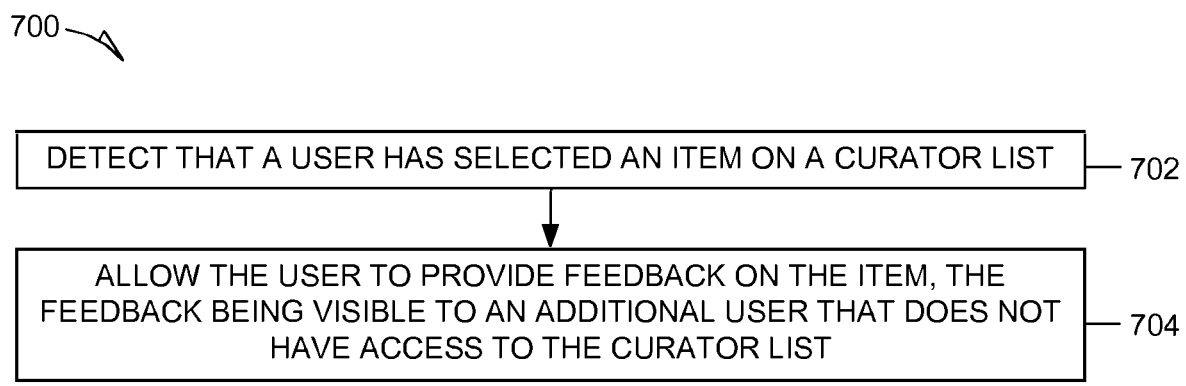
FIG. 7 is a flowchart illustrating an example method of controlling a visibility of user comments on a curator list.

FIG. 7 is a flowchart illustrating an example method 700 of controlling a visibility of user comments on a curator list. At operation 702, the curation module 206 detects that a user has selected an item on a curator list. At operation 704, the curation module 206 enables the user to provide feedback on the item. In various embodiments, the feedback provided by the user on the item is visible to an additional user that does not have access to the curator list. For example, in various embodiments, the repository-management module 202 stores the user feedback on the item in a central repository that is accessible to users of the system independently of whether they have access to the curator list that the user was accessing when the user provided the feedback. In other embodiments, the feedback that the user provides is visible only to those whom the user specifically designates (e.g., friends of the user). In other embodiments, the feedback that the user provides is visible to users that have access to the same curator list that the user was accessing when the user posted the feedback on the item. In various embodiments, the visibility of the posting is based on a specification of the user of the context of the feedback (e.g., whether the feedback is made in the context of the curator list or in the context of the listings of the item on the network-based publication system generally).

Figure 8:
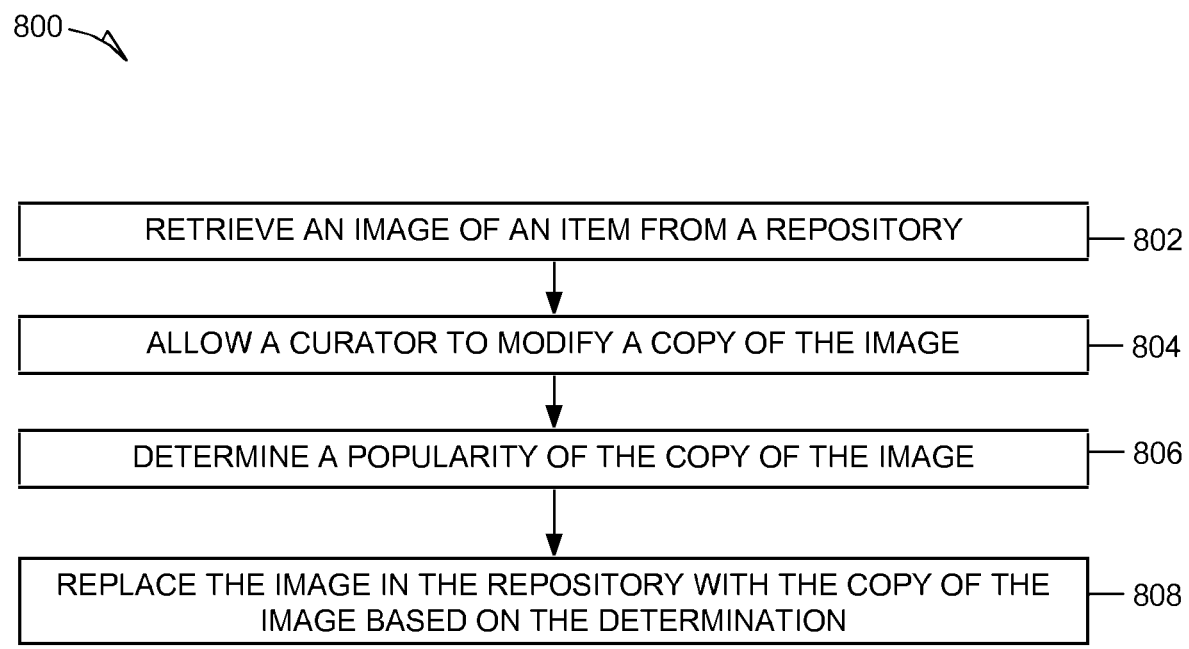
FIG. 8 is a flowchart illustrating an example method of updating a central image repository based on a popularity of a curated image.

FIG. 8 is a flowchart illustrating an example method 800 of updating a central image repository based on a popularity of a curated image. At operation, the repository-management module 202 retrieves an image from the repository (e.g., as part of a generation of a default curator list containing an item corresponding to the image). At operation 804, the curation module 206 allows a curator to modify a copy of the image. Alternatively, the curation module 206 generates metadata describing alterations that are to be made to the image when it is displayed on a curator list maintained by the curator. At operation 806, the user-monitoring module 210 determines a popularity of the copy of the image. The user-monitoring module 210 may determine the popularity of the image based on various factors, such as the factors discussed above with respect to operation 606 of FIG. 6. At operation 808, based on the popularity of the copy of the image exceeding a popularity of the image stored in the central repository, the repository-management module 202 replaces the image in the repository with the copy of the image.

Figure 9:
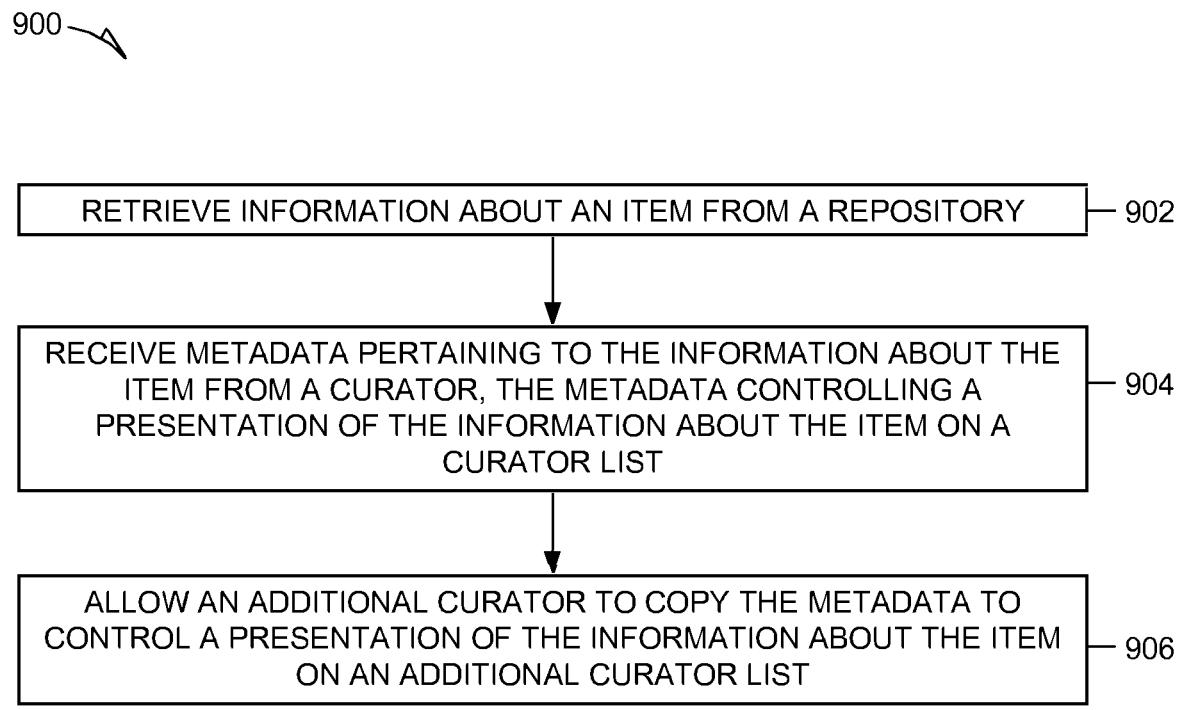
FIG. 9 is a flowchart illustrating an example method of sharing curated and customized content of a curated list.

FIG. 9 is a flowchart illustrating an example method 900 of sharing curated and customized content of a curated list. At operation 902, information about an item on a curated list is retrieved from a central repository. At operation 904, metadata pertaining to the information about the item is received from the curator. The metadata may control a presentation of the information about the item on a curator list, such as a style of the image or any customizable attribute of a curator list as described above. At operation 906, the curation module 206 allows an additional curator to copy the metadata to an additional curator list, thus causing the information about the item to appear on the additional curator list just as it appears on the curator list. In various embodiments, an actual copy of the metadata is not made. Instead, the metadata on the additional curated page is linked to (or shared with) the metadata on the curated page. Thus, a change to the metadata stored with respect to the curated page is reflected on the additional curated page. In various embodiments, the user intending to reuse metadata may specify whether to make a copy of the metadata or link to existing metadata.

Figure 10:
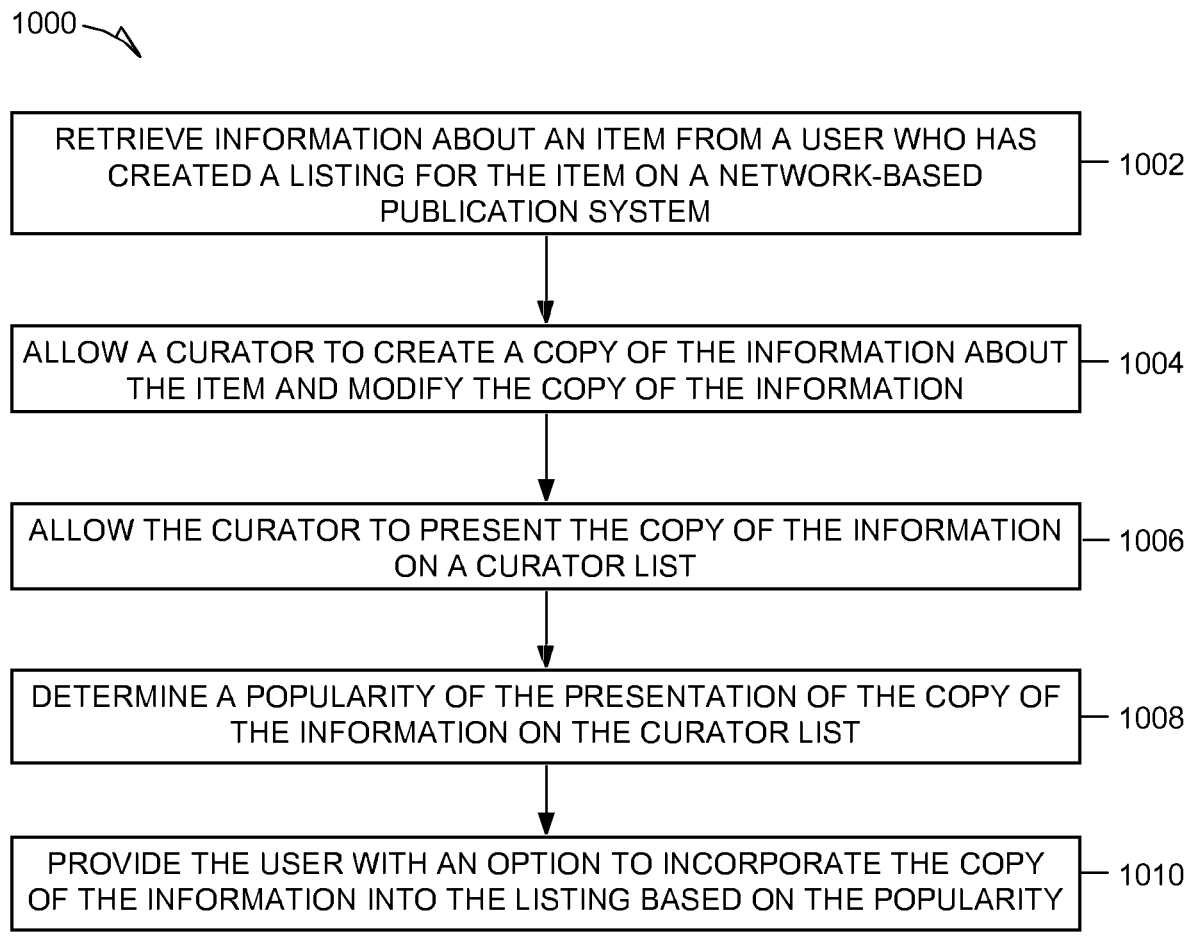
FIG. 10 is a flowchart illustrating an example method of providing a user with an option to incorporate curated content into a listing of an item on the network-based publication system.

FIG. 10 is a flowchart illustrating an example method 1000 of providing a user with an option to incorporate curated content into a listing of an item on the network-based publication system. At operation 1002, the repository-management module 202 receives information about an item that is to be listed on the network-based publication system from a user. At operation 1004, the curation module 206 allows a curator to create a copy of the information about the item. Furthermore, the curation module 206 allows the user to customize or personalize the copy of the information about the item. At operation 1006, the publication module 208 allows the curator to present the copy of the information on a curator list to other users. At operation 1008, the user-monitoring module 210 determines a popularity of the presentation of the copy of the information on the curator list. At operation 1010, the repository-management module 202 provides the user with the option to incorporate the copy of the information into the listing based on the popularity of the copy of the information. Thus, original content submitted by a user to facilitate a transaction of an item may be enhanced by a curator, identified as an improvement over the original content, and incorporated into a listing pertaining to the item.

FIG. 11 is a screenshot of a portion of an example user interface 1100 for presenting a curator list. In various embodiments, the user interface 1100 is presented or updated by the curation module 206. The user interface 1100 includes a default title for the curator list that corresponds to keywords entered by a user in a search query. For example, the title "Awesome mens shoes size 12 items" is generated for query that includes the keywords "mens shoes size 12." The user interface 1100 includes a default description for the curator list (e.g., a placeholder requesting that the curator enter a description). The user interface 1100 includes information about the curator list, such as the number of items in the list, the number of categories to which the items belong, the number of notes added to the list, and the number of "likes" indicated by users with access to the curator list. In various embodiments, the number of items in the default curator list is limited to a predefined top number of items (e.g., 10) for which information is stored in a central repository that matches the query. In various embodiments, the user interface 1100 presents the items in the default curator list using only their images. For items having multiple images, the top image includes a user interface element (e.g., a page flip) that gives a hint about the next image in the stack of images. Additionally, a numerical indicator may be overlaid over the image to indicate which image of how many images in the stack is currently displayed.

Figure 12:
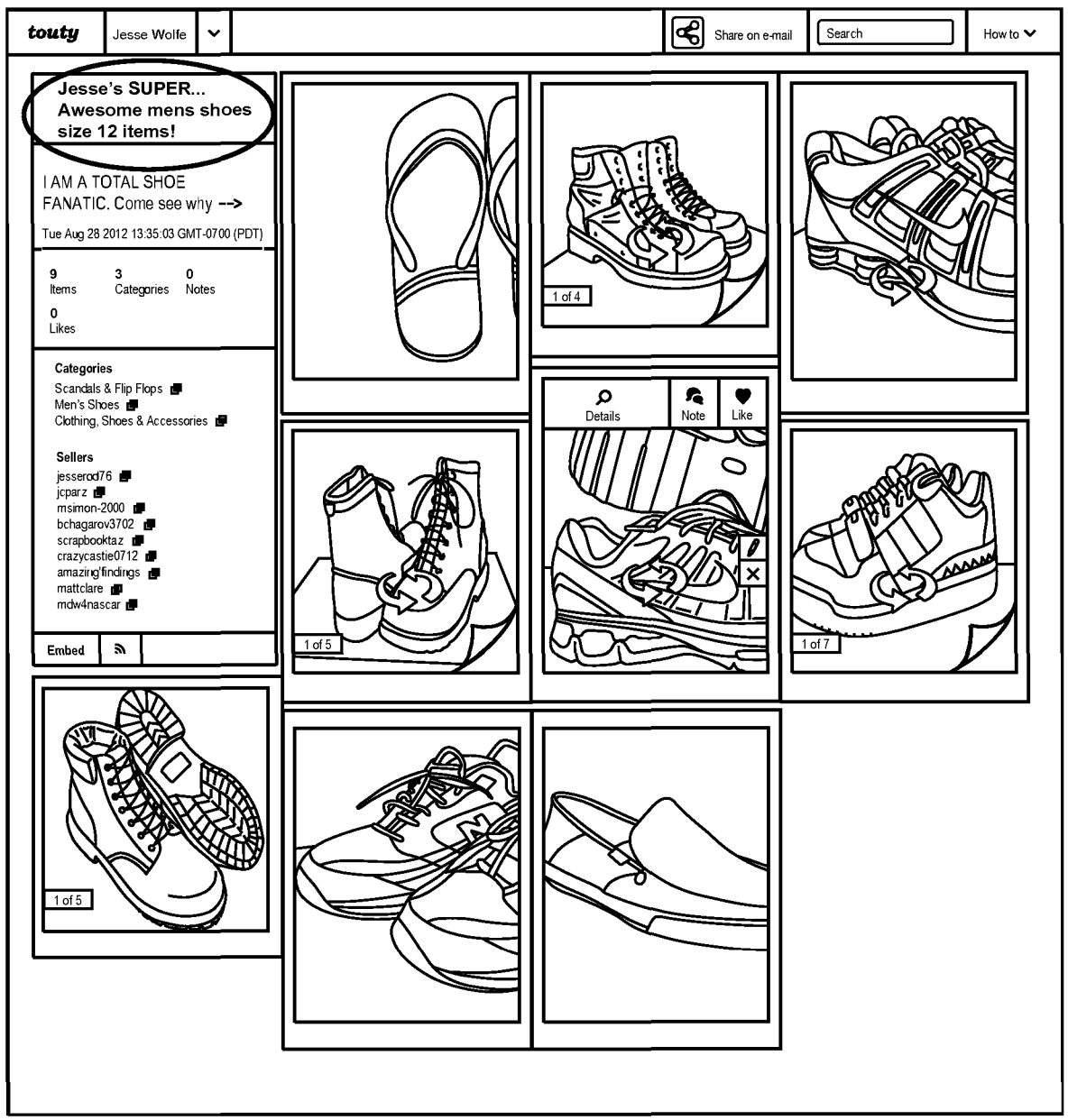
FIG. 12 is a screenshot of a portion of an example user interface for inline editing of a title of a curator list.

FIG. 12 is a screenshot of a portion of an example user interface 1200 for inline editing of a title of a curator list. In various embodiments, the user interface 1200 is presented or updated by the curation module 206. The user interface 1200 enables a curator to click on the title to access an edit box containing the title overlaid over the title. Upon submission of the text in the edit box, the text in the edit box replaces the old title. Thus, the editing is done inline without a need for the curator to refresh the page containing the curator list.

Figure 13:
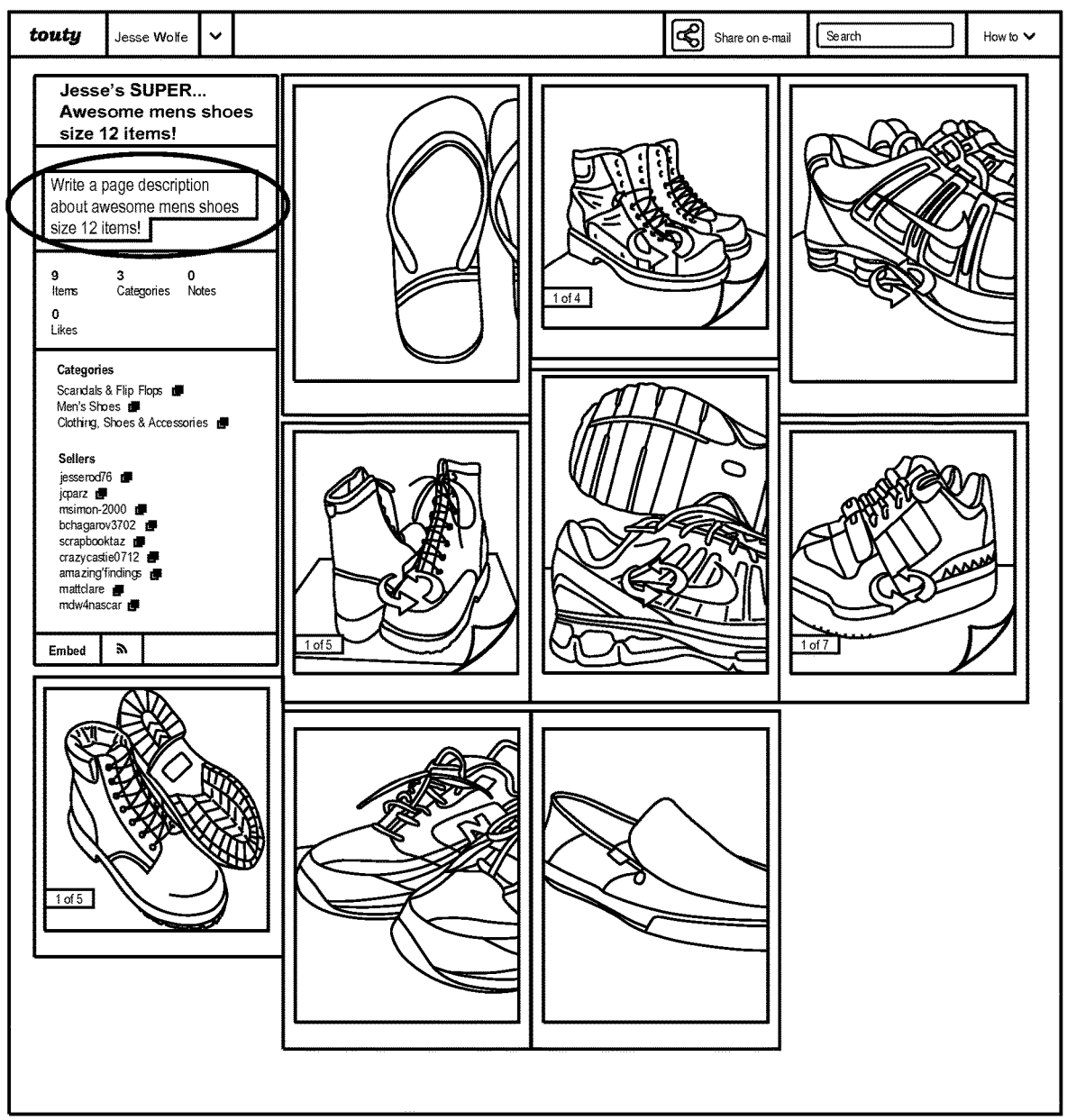
FIG. 13 is a screenshot of a portion of an example user interface for inline editing of description of a curator list.

FIG. 13 is a screenshot of a portion of an example user interface 1300 for inline editing of description of a curator list. In various embodiments, the user interface 1300 is presented or updated by the curation module 206. The user interface 1300 includes an edit box that appears in place of the description when the user clicks on the description. In various embodiments, editing of text that is associated with the curator list is performed inline as described and shown with respect to FIGS. 12 and 13. In various embodiments, the example user interface 1200 enables the user to control which information about the curator list (e.g., title, description, categories, sellers, item count, category count, note count, like count), if any, are shown on the page containing the curator list. In various embodiments, a date of a last change to a date item (e.g., the description) is shown next to the data item.

Figure 14:
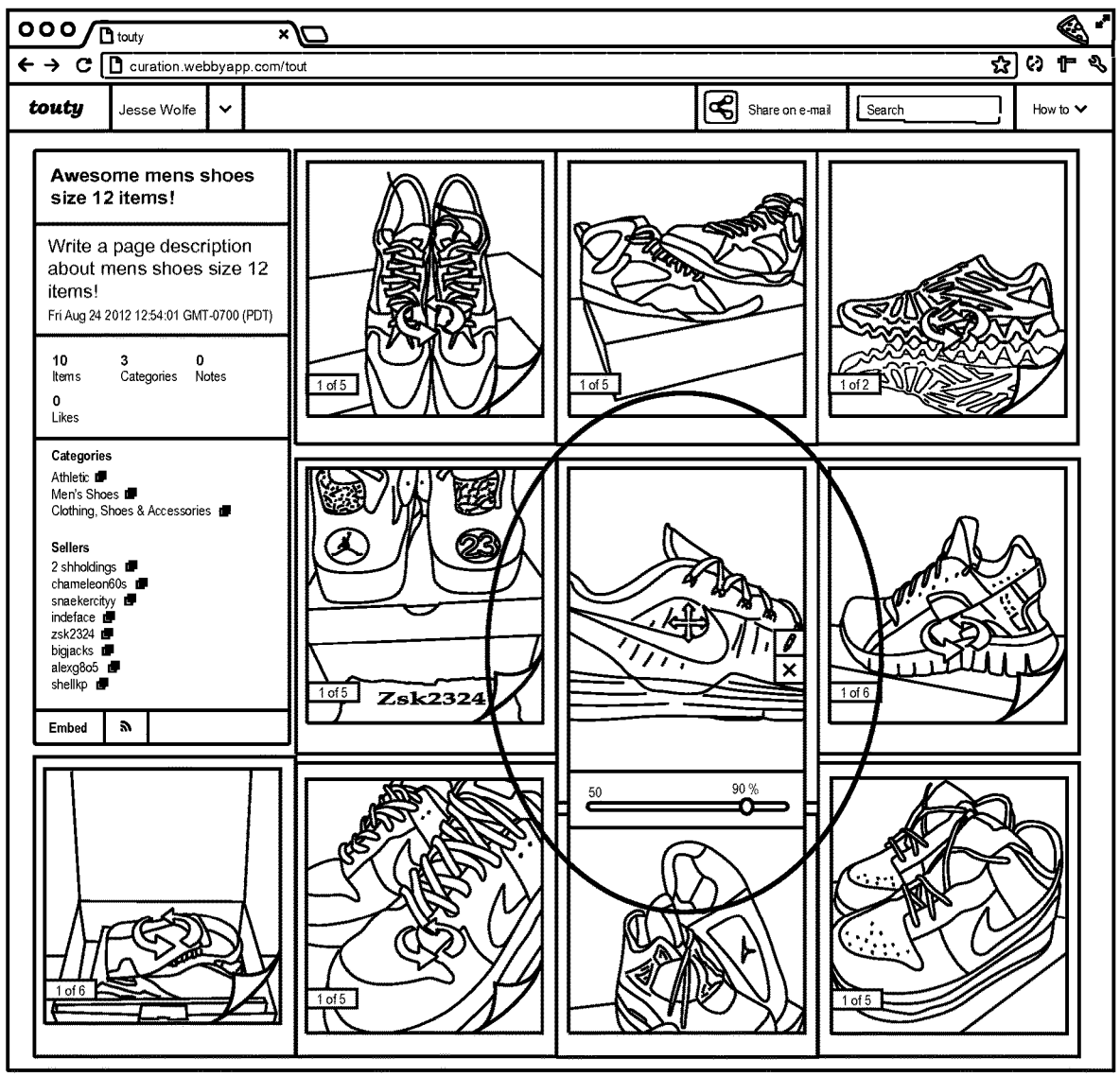
FIG. 14 is a screenshot of a portion of an example user interface for inline customizing of an image associated with an item.

FIG. 14 is a screenshot of a portion of an example user interface 1400 for inline customizing of an image associated with an item. In various embodiments, the user interface 1400 is presented or updated by the curation module 206. The user interface 1400 provides various tools to a curator to customize or personalize an item on the curator list. In various embodiments, embodiments, the tools include a pencil tool for associating a note with the item, a deletion tool for deleting the item from the curator list, a panning tool for repositioning an image associated with the item within a frame for the image, and a zooming tool for specifying a size of the image as a percentage of its maximum size. In various embodiments, the tools appear as representative icons when the user selects the item (e.g., hovers a mouse cursor over an image associated with the item). In various embodiments, when an item is selected, it becomes highlighted (e.g., with shadowing or other effects) to distinguish it from other items in the curator list.

Figure 15:
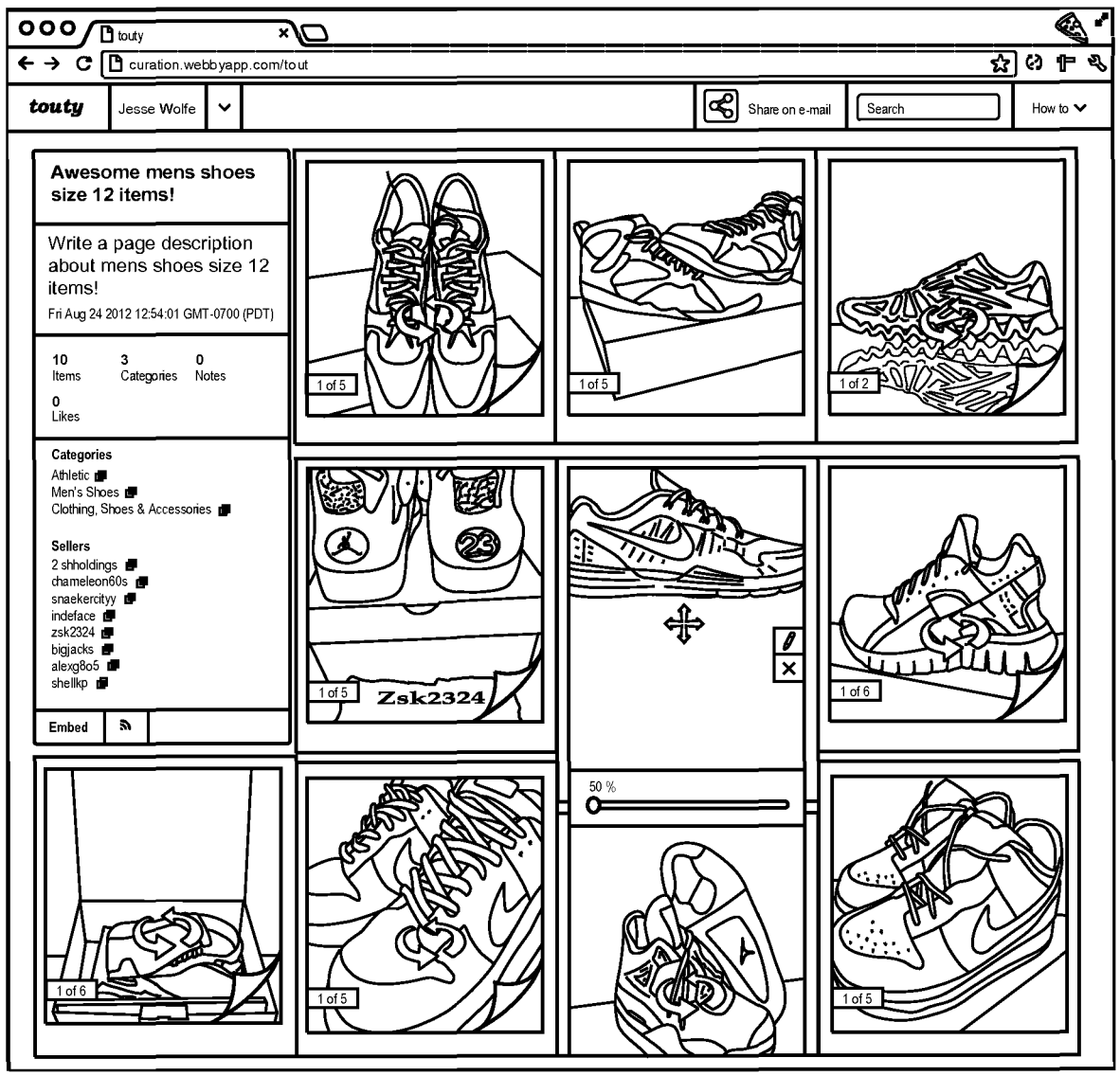
FIG. 15 is a screenshot of a portion of an example user interface depicting the results of an inline customization of the image of FIG. 14.

FIG. 15 is a screenshot of a portion of an example user interface 1500 depicting the results of an inline customization of the image of FIG. 14. Here, the curation module 206 has reduced the size of the image to 50% of its maximum size, making it more consistent with the sizes of the other images included on the curator list. Additionally, the curation module 206 has moved the image to the top part of the frame containing the image. The tools remain visible for further customizations because the image is still selected.

Figure 16:
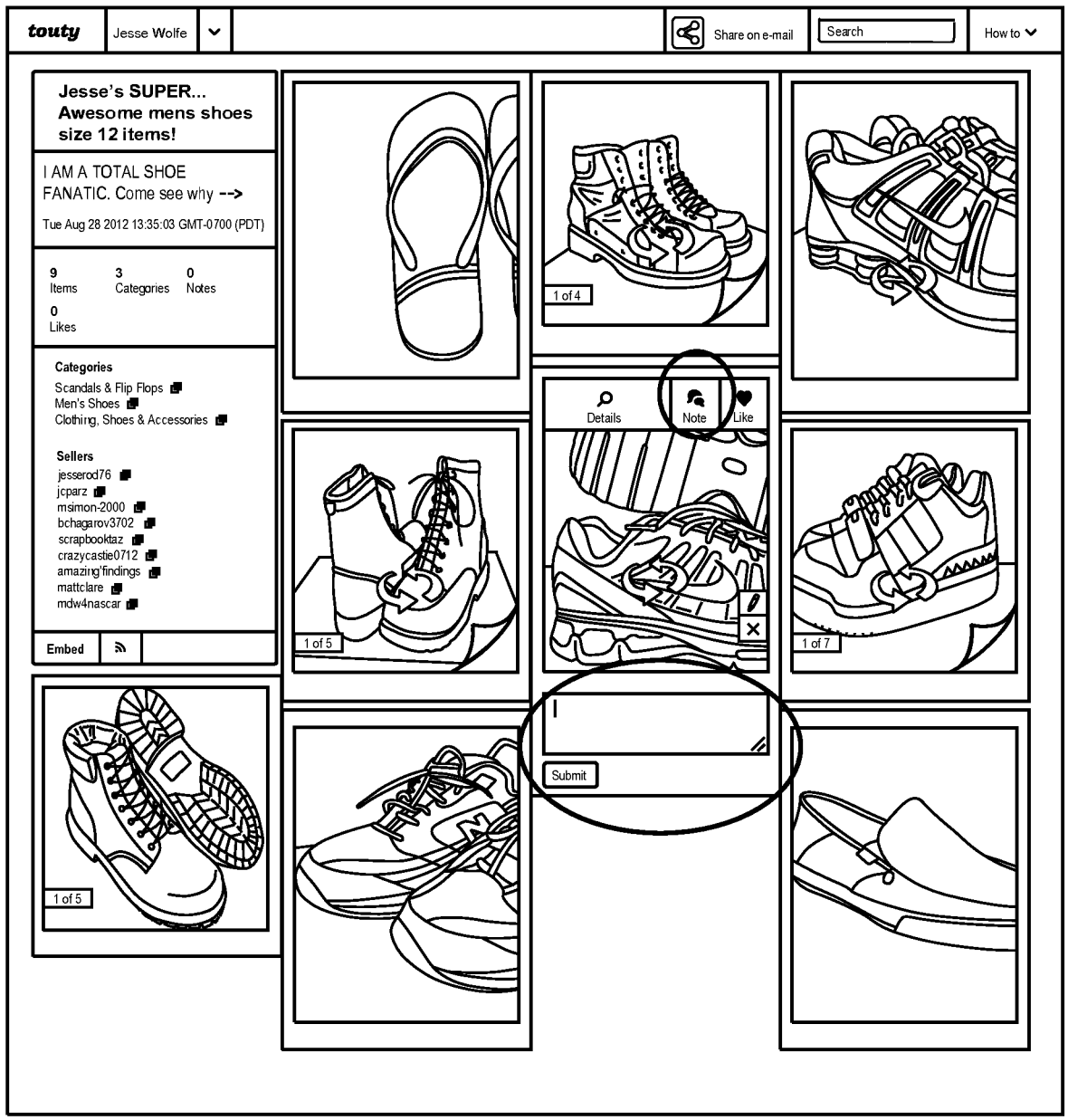
FIG. 16 is a screenshot of a portion of an example user interface for submitting a note pertaining to an image of an item.

FIG. 16 is a screenshot of a portion of an example user interface 1600 for submitting a note pertaining to an image of an item. In various embodiments, the user interface 1400 is presented or updated by the curation module 206. In various embodiments, the curation module allows the curator or another user to access or provide additional information pertaining to an image of an item. For example, upon clicking a pencil tool, a user may be presented with options for viewing details associated with the item (described below), add a note to the image, or specify a liking of the image. Upon selecting the option to add a note to the image, the user may be presented with a text box into which the user may submit the note. In various embodiments, the note submission process is performed inline, not requiring a refreshing of the page containing the curator list.

Figure 17:
FIG. 17 is a screenshot of a portion of an example user interface depicting the result of a submission of two notes pertaining to images presented on the curator list of FIG. 16.

FIG. 17 is a screenshot of a portion of an example user interface 1700 depicting the result of a submission of two notes pertaining to images presented on the curator list of FIG. 16. Here, the curator has added a note (e.g., "Go USC!") to an image of a pair of sandals bearing an insignia of the University of Southern California. Additionally, the curator has added a note to an image of a pair of shoes that is included in the curator list. In various embodiments, these notes are added as metadata that is linked to the image and stored in a user-specific repository, as described above.

Figure 18:
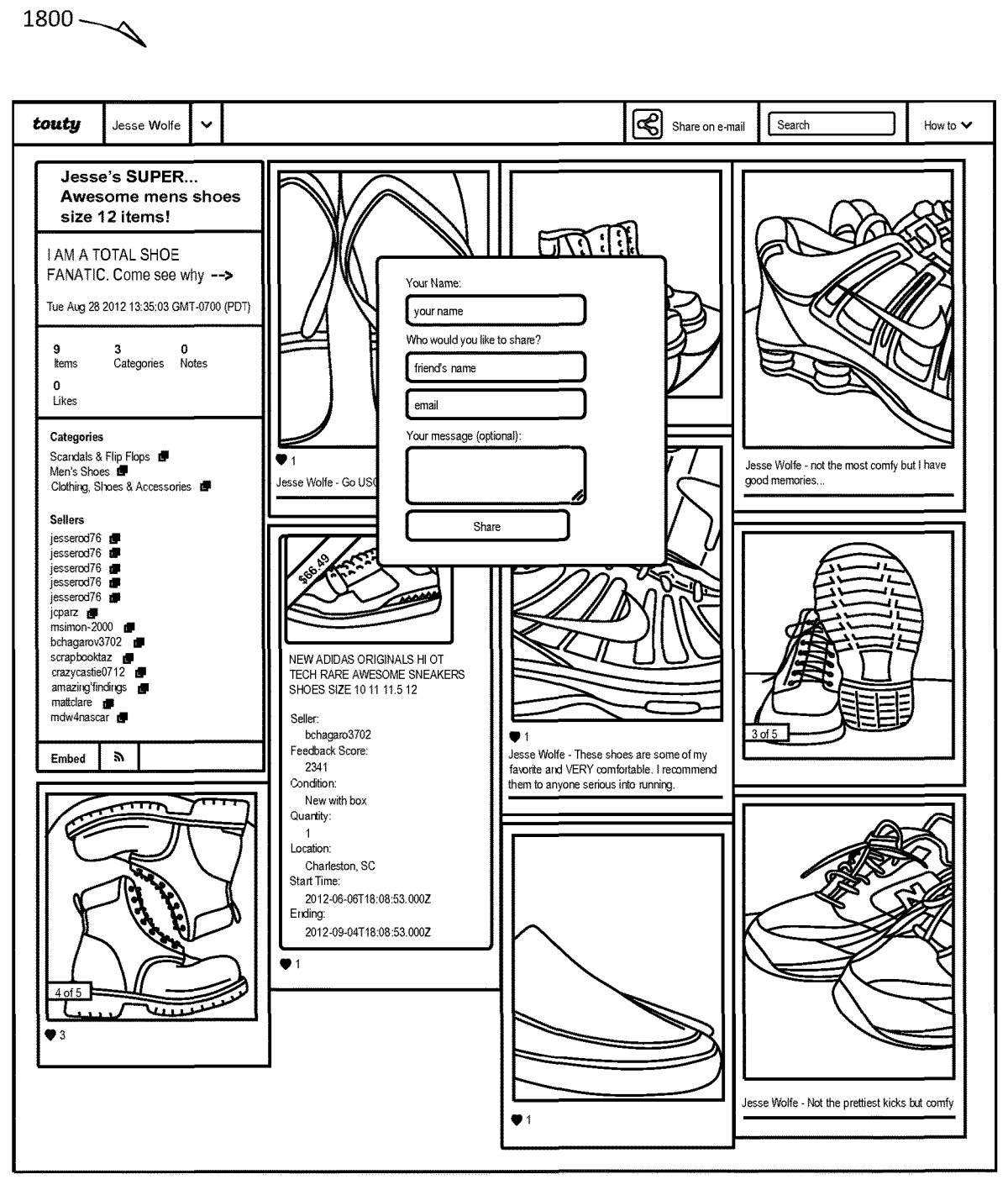

FIG. 18 is a screenshot of a portion of an example user interface 1800 for submitting a curator list for publication to other users. In various embodiments, when the curator indicates an intention to publish a curator list, the publication module 210 displays a submission form in which the user may specify various additional metadata to associate with the curator list, including the name of the curator, the names of users that the curator intends to which the curator intends to provide access to the curator list, email addresses of the users to which the curator intends to provide access, additional notes that the curator intends to provide to the users, and so on. Upon submission of the form, the publication module 210 may publish the curator list.

Figure 19:
FIG. 19 is a screenshot of a portion of an example user interface for navigating multiple images associated with an item in a curator list.

FIG. 19 is a screenshot of a portion of an example user interface 1900 for navigating multiple images associated with an item in a curator list. The user interface 1900 may be presented or updated by the curation module 206. In various embodiments, a user interface element is used to convey that at least one image is hidden under the current image for the item and is accessible by the user performing an action (e.g., clicking on a turned-page-style corner of the image). Additionally, a numerical indicator may indicate to the user which image of how many images is currently displayed in an image frame corresponding to the item. In various embodiments, a curator may use the flip-through user interface to access and then remove one or more particular images from the image stack or edit one or more particular images in the image stack that is associated with an item. In various embodiments, the user may be able to select an icon to rotate an image in three-dimensions.

Figure 20:
FIG. 20 is a screenshot of a portion of an example user interface for specifying a liking of an image of an item in a curator list.

FIG. 20 is a screenshot of a portion of an example user interface 2000 for specifying a liking of an image of an item in a curator list. The user interface 2000 may be presented or updated by the curation module 206. The user interface 2000 displays a user interface element (e.g., a "Like" button) when the user selects an item in a curated list. In various embodiments, the user interface may update a number of "likes" for the image or a total number "likes" associated with the curated list the first time a user activates the user interface element with respect to an image. In various embodiments, the user interface element may serve as a toggle for adding and removing a liking of an image.

Figure 21:
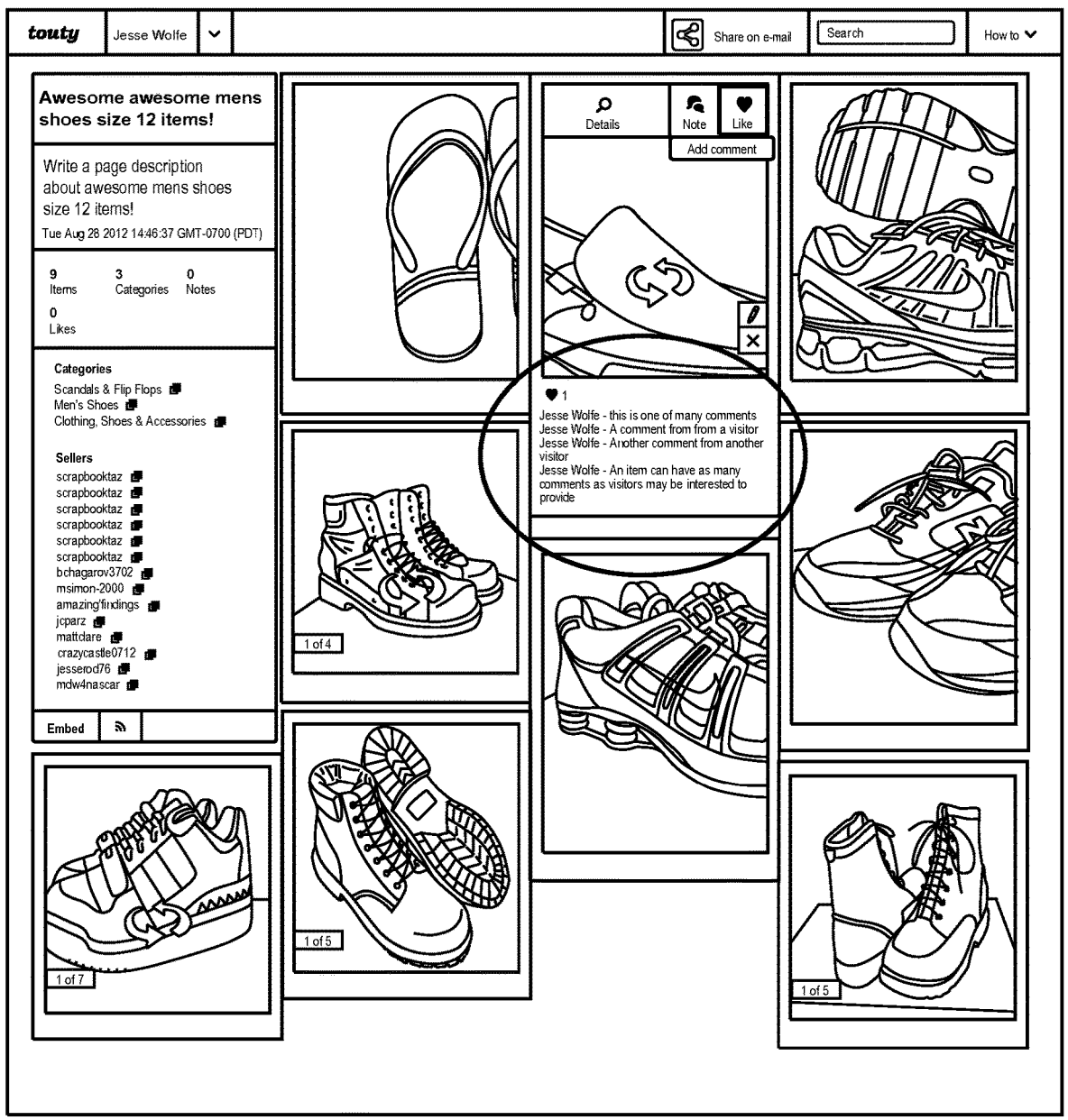
FIG. 21 is a screenshot of a portion of an example user interface for adding comments to an image associated with an item.

FIG. 21 is a screenshot of a portion of an example user interface 2100 for adding comments to an image associated with an item. The user interface 2100 may be presented or updated by the curation module 206. The user interface may present a text box into which a user may submit a note to associate with the item. In various embodiments, as described above, the user may maintain control over any content that the user submits with respect to an item in a curated list, including controlling a visibility of the content to other users. For example, the user interface 2100 may allow the user to specify a context in which the note may be made visible to other users, as described above.

Figure 22:
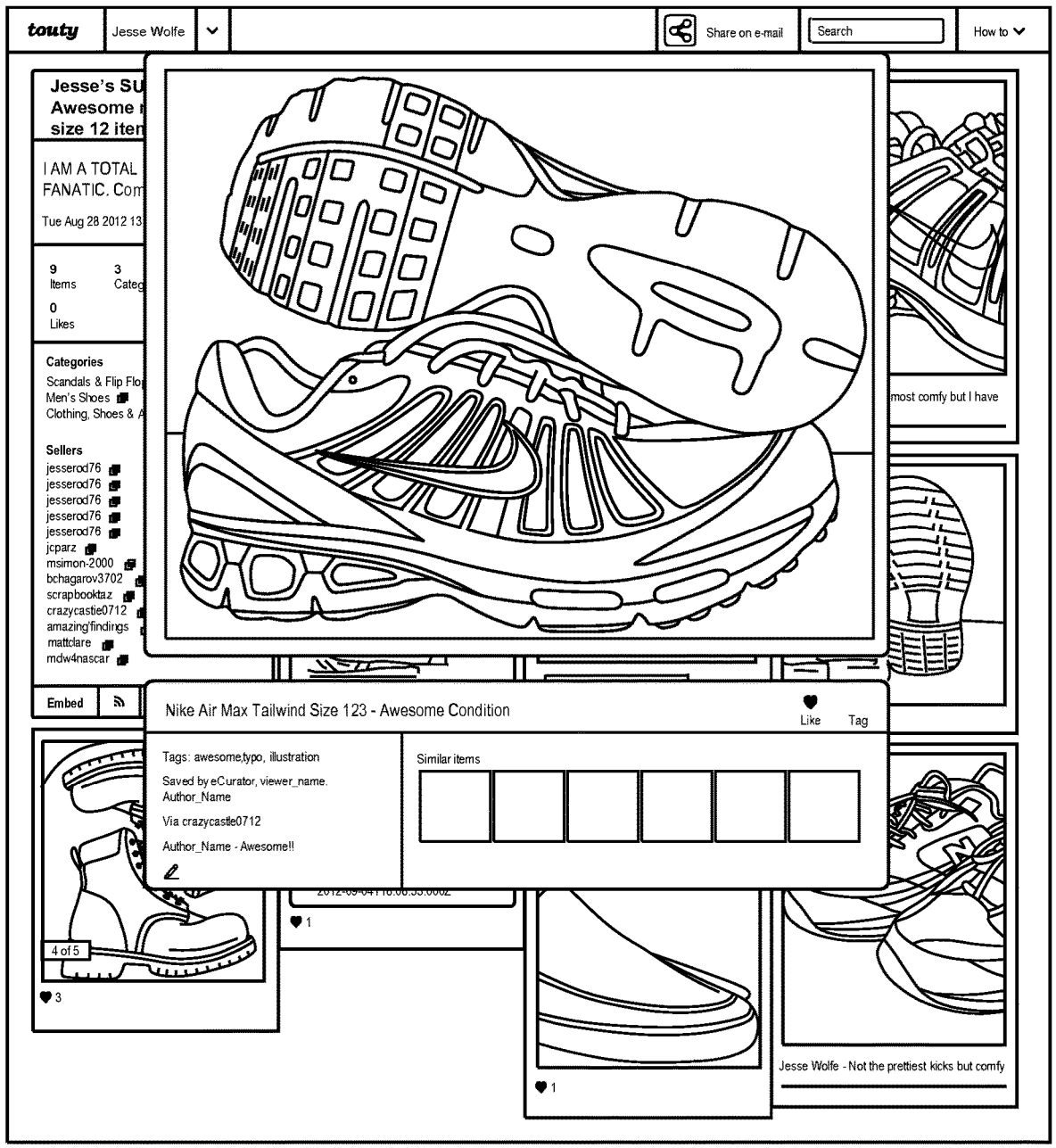
FIG. 22 is a screenshot of a portion of an example user interface for viewing details pertaining to an image of an item.

FIG. 22 is a screenshot of a portion of an example user interface 2200 for viewing details pertaining to an image of an item. The user interface 2200 may be presented or updated by the curation module 206. The user interface 2200 may be overlaid over the curator list. It may include a higher resolution image than the image presented in the curator list. It may include additional details pertaining to the image, including a title of the item corresponding to the image as it is listed on the network-based publication system, tags associated with the image (e.g., by the curator or other users), user names of users who added metadata to the image, the curator who made the image available to the user, and so on. Additionally, the user interface 2200 may include user interface elements through which the user may specify a liking for the image, add tags to the image, or add comments to the image. Additionally, the user interface 2200 may include listings of similar items (e.g., as determined by the curator or as determined by data maintained with respect to the items by the network-based publication system).

Figure 23:
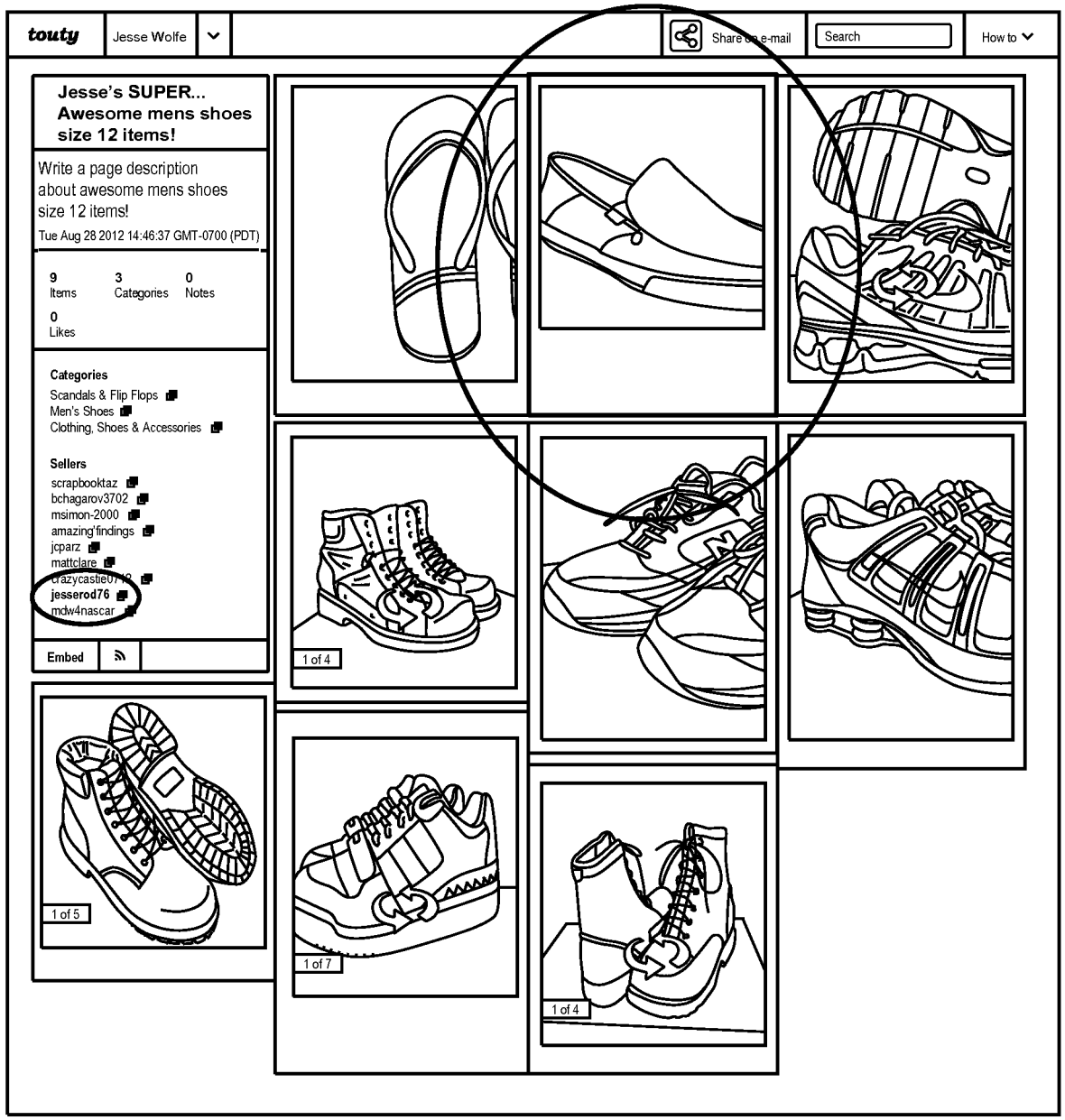
FIG. 23 is a screenshot of a portion of an example user interface for viewing details pertaining to an image of an item.

FIG. 23 is a screenshot of a portion of an example user interface 2300 for viewing details pertaining to an image of an item. The user interface 2200 may be presented or updated by the curation module 206. The user interface 2200 may automatically highlight images in the curator list that correspond to categories or sellers that a user selects. For example, the user interface 2200 highlights a green shoe based on a selection of a seller of the shoe by the user.

Figure 24:
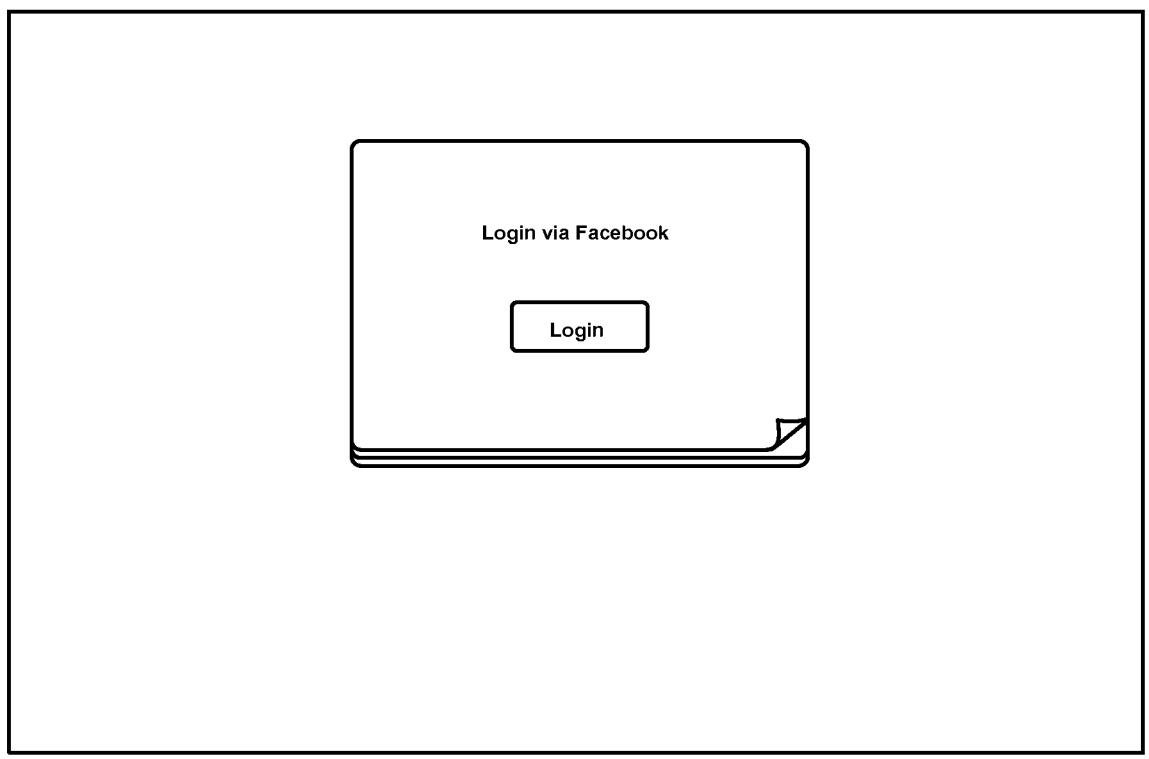
FIG. 24 is a screenshot of a portion of an example user interface for logging into the applications via a third-party.

FIG. 24 is a screenshot of a portion of an example user interface 2400 for logging into the applications 120 via a third-party application (e.g., Facebook). In various embodiments, upon logging into the applications 120 via the third-party application, actions that the user performs with respect to the applications 120 may be reflected in the third-party application. For example, upon publishing a curator list, a user may be prompted to post a notification on his wall announcing the publication.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures should be considered. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 25:
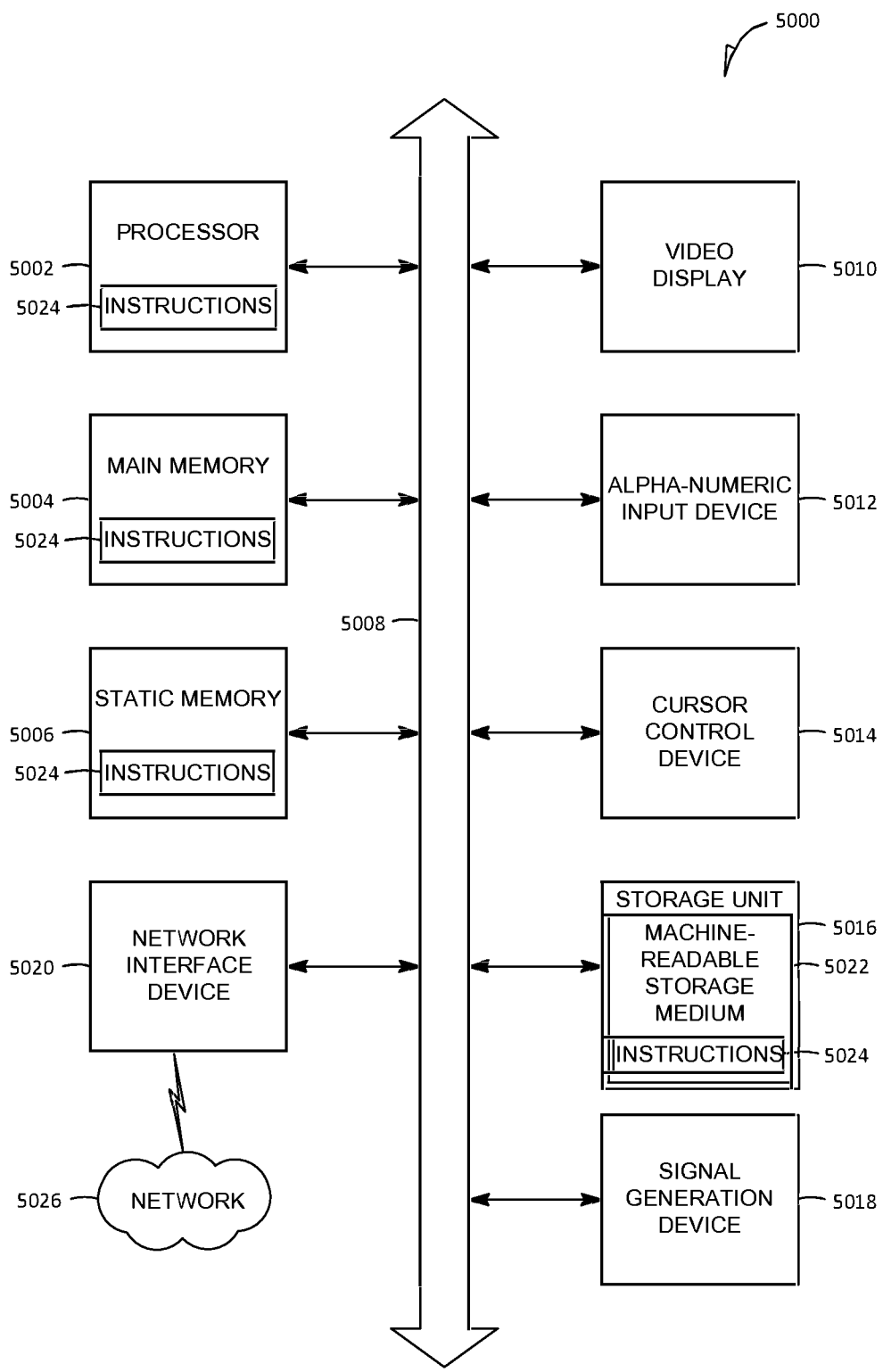
FIG. 25 is a block diagram of machine in the example form of a computer system within which instructions for causing the machine to perform any one or more of the methodologies discussed herein may be executed.

FIG. 25 is a block diagram of machine in the example form of a computer system 5000 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 5000 includes a processor 5002 (e.g., a central processing unit (CPU), a graphics processing unit (GPU) or both), a main memory 5004 and a static memory 5006, which communicate with each other via a bus 5008. The computer system 5000 may further include a video display unit 5010 (e.g., a liquid crystal display (LCD) or a cathode ray tube (CRT)). The computer system 5000 also includes an alphanumeric input device 5012 (e.g., a keyboard), a user interface (UI) navigation (or cursor control) device 5014 (e.g., a mouse), a storage unit 5016, a signal generation device 5018 (e.g., a speaker) and a network interface device 5020.

The storage unit 5016 includes a machine-readable medium 5022 on which is stored one or more sets of data structures and instructions 5024 (e.g., software) embodying or utilized by any one or more of the methodologies or functions described herein. The instructions 5024 may also reside, completely or at least partially, within the main memory 5004 and/or within the processor 5002 during execution thereof by the computer system 5000, the main memory 5004 and the processor 5002 also constituting machine-readable media. The instructions 5024 may also reside, completely or at least partially, within the static memory 5006.

While the machine-readable medium 5022 is shown in an example embodiment to be a single medium, the term "machine-readable medium" may include a single medium or multiple media (e.g., a centralized or distributed database, and/or associated caches and servers) that store the one or more instructions 5024 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

The instructions 5024 may further be transmitted or received over a communications network 5026 using a transmission medium. The instructions 5024 may be transmitted using the network interface device 5020 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 5026 may be the same as network 104 of FIG. 1.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to allow those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    displaying, by at least one computing device, a presentation of a listing on a networked based publication system to a curating user, the presentation of the listing including a first image submitted by a submitting user of the listing, wherein the submitting user and the curating user are different users of the networked based publication system;
    providing, by the at least one computing device, an inline customization user interface for display to a device associated with the curating user, the inline customization user interface having editing tools which include at least one tool that creates, based on receipt of a user input of the curating user, a second image by customizing the first image submitted by the submitting user as used within the presentation of the listing;
    receiving, by the at least one computing device, the second image from the curating user and the second image used with at least one curated presentation of the listing;
    determining, by the at least one computing device, that a popularity of the second image from the curating user exceeds a popularity of the first image submitted by the submitting user; and
    responsive to the determination that the popularity of the second image from the curating user exceeds the popularity of the first image submitted by the submitting user, replacing, by the at least one computing device, the first image submitted by the submitting user with the second image from the curating user so that the presentation of the listing includes the second image from the curating user.

2. The method as described in claim 1, further comprising determining that the popularity of the second image from the curating user, as determined by likes of the second image from the curating user, exceeds the popularity of the first image submitted by the submitting user, as determined by likes of the first image submitted by the submitting user.

3. The method as described in claim 1, further comprising determining that the popularity of the second image from the curating user, as determined by comments added to the second image from the curating user, exceeds the popularity of the first image submitted by the submitting user, as determined by comments added to the first image submitted by the submitting user.

4. The method as described in claim 1, further comprising determining that the popularity of the second image from the curating user, as determined by user feedback provided in relation to the second image from the curating user, exceeds the popularity of the first image submitted by the submitting user, as determined by user feedback provided in relation to the first image submitted by the submitting user.

5. The method as described in claim 1, further comprising determining the popularity of the second image from the curating user and the popularity of the first image submitted by the submitting user based on:
    purchases made by users in relation to the presentation of the listing including the first image submitted by the submitting user and in relation to the at least one curated presentation of the listing using the second image from the curating user;
    amount spent by the users on purchases in relation to the presentation of the listing including the first image submitted by the submitting user and in relation to the at least one curated presentation of the listing using the second image from the curating user; or
    amount of time users browse the presentation of the listing including the first image submitted by the submitting user and browse the at least one curated presentation of the listing using the second image from the curating user.

6. The method as described in claim 1, wherein the second image from the curating user is added to the listing based on instructions received from the curating user.

7. The method as described in claim 1, wherein the second image from the curating user is a customized copy of the first image submitted by the submitting user.

8. The method as described in claim 7, wherein the first image submitted by the submitting user is customized to form the second image from the curating user based on at least one of:
    instructions to crop the first image submitted by the submitting user;
    instructions to resize the first image submitted by the submitting user;
    instructions to reposition the first image submitted by the submitting user;
    instructions to rotate the first image submitted by the submitting user;
    selection of a filtering option for the first image submitted by the submitting user; or
    instructions to remove the filtering option from the first image submitted by the submitting user.

9. The method as described in claim 1, further comprising:
    receiving a third image from an additional curating user for use with additional curated presentations of the listing; and
    responsive to a determination that a popularity of the third image from the additional curating user exceeds a popularity of the second image from the curating user, replacing the second image from the curating user with the third image from the additional curating user.

10. The method as described in claim 1, wherein replacing the first image submitted by the submitting user with the second image from the curating user, so that the presentation of the listing includes the second image from the curating user, includes replacing the first image as stored in a central repository with the second image in the central repository.

11. The method as described in claim 1, wherein the second image from the curating user is received based on selection, by the curating user, of a display of an icon representing at least one tool for customizing the at least one curated presentation of the listing.

12. The method as described in claim 1, wherein the second image from the curating user for use with the at least one curated presentation of the listing is positioned in the at least one curated presentation of the listing responsive to user input received via an inline customization user interface to position the second image from the curating user in the at least one curated presentation of the listing.

13. The method as described in claim 1, wherein the editing tools included by the inline customization user interface edit the listing without the curating user refreshing a page on which the listing is presented.

14. A system comprising:
one or more processors; and
a management module implemented by the one or more processors and configured to:
cause display of a presentation of a listing on a networked based publication system to a curating user, the presentation of the listing including a first image submitted by a submitting user of the listing, wherein the submitting user and the curating user are different users of the networked based publication system;
provide an inline customization user interface for display to a device associated with the curating user, the inline customization user interface having editing tools which include at least one tool that creates, based on receipt of a user input of the curating user, a second image by customizing the first image submitted by the submitting user as used within the presentation of the listing;
receive the second image from the curating user and the second image used with at least one curated presentation of the listing;
determine that a popularity of the second image from the curating user exceeds a popularity of the first image submitted by the submitting user; and
responsive to the determination that the popularity of the second image from the curating user exceeds the popularity of the first image submitted by the submitting user, replace the first image submitted by the submitting user with the second image from the curating user so that the presentation of the listing includes the second image from the curating user.

15. The system as described in claim 14, wherein the management module is further configured to determine that the popularity of the second image from the curating user, as determined by likes of the second image from the curating user, exceeds the popularity of the first image submitted by the submitting user, as determined by likes of the first image submitted by the submitting user.

16. The system as described in claim 14, wherein the management module is further configured to determine that the popularity of the second image from the curating user, as determined by comments added to the second image from the curating user, exceeds the popularity of the first image submitted by the submitting user, as determined by comments added to the first image submitted by the submitting user.

17. A non-transitory machine-readable medium embodying a set of instructions that, when executed by a processor of a machine, causes the machine to perform operations, the operations comprising:

displaying a presentation of a listing on a networked based publication system to a curating user, the presentation of the listing including a first image submitted by a submitting user of the listing, wherein the submitting user and the curating user are different users of the networked based publication system;
providing an inline customization user interface for display to a device associated with the curating user, the inline customization user interface having editing tools which include at least one tool that creates, based on receipt of a user input of the curating user, a second image by customizing the first image submitted by the submitting user as used within the presentation of the listing;
receiving the second image from the curating user and the second image used with at least one curated presentation of the listing;
determining that a popularity of the second image from the curating user exceeds a popularity of the first image submitted by the submitting user; and
responsive to the determination that the popularity of the second image from the curating user exceeds the popularity of the first image submitted by the submitting user, replacing the first image submitted by the submitting user with the second image from the curating user so that the presentation of the listing includes the second image from the curating user.

18. The non-transitory machine-readable medium as described in claim 17, wherein the operations further comprise determining that the popularity of the second image from the curating user, as determined by likes of the second image from the curating user, exceeds the popularity of the first image submitted by the submitting user, as determined by likes of the first image submitted by the submitting user.

19. The non-transitory machine-readable medium as described in claim 17, wherein the operations further comprise determining that the popularity of the second image from the curating user, as determined by user feedback provided in relation to the second image from the curating user, exceeds the popularity of the first image submitted by the submitting user, as determined by user feedback provided in relation to the first image submitted by the submitting user.

20. The non-transitory machine-readable medium as described in claim 17, wherein the operations further comprise determining the popularity of the second image from the curating user and the popularity of the first image submitted by the submitting user based on:
purchases made by users in relation to the presentation of the listing including the first image submitted by the submitting user and in relation to the at least one curated presentation of the listing using the second image from the curating user;
amount spent by the users on purchases in relation to the presentation of the listing including the first image submitted by the submitting user and in relation to the at least one curated presentation of the listing using the second image from the curating user; or
amount of time users browse the presentation of the listing including the first image submitted by the submitting user and browse the at least one curated presentation of the listing using the second image from the curating user.

* * * * *